(12) United States Patent
Iida et al.

(10) Patent No.: US 12,551,913 B2
(45) Date of Patent: Feb. 17, 2026

(54) PAINTING ROBOT

(71) Applicant: ABB Schweiz AG, Baden (CH)

(72) Inventors: Kisumi Iida, Tokyo (JP); Takahiro Tawata, Tokyo (JP); Norio Umezawa, Tokyo (JP)

(73) Assignee: ABB Schweiz AG, Baden (CH)

( * ) Notice: Subject to any disclaimer, the term of this patent is extended or adjusted under 35 U.S.C. 154(b) by 391 days.

(21) Appl. No.: 18/182,302

(22) Filed: Mar. 10, 2023

(65) Prior Publication Data

US 2023/0302479 A1    Sep. 28, 2023

(30) Foreign Application Priority Data

Mar. 28, 2022    (JP) .................. 2022-052325

(51) Int. Cl.
*B05B 13/04*    (2006.01)
*B05B 12/00*    (2018.01)
(Continued)

(52) U.S. Cl.
CPC ........ *B05B 13/0431* (2013.01); *B05B 12/008* (2013.01); *B05B 12/087* (2013.01);
(Continued)

(58) Field of Classification Search
None
See application file for complete search history.

(56) References Cited

U.S. PATENT DOCUMENTS 4,798,341 A * 1/1989 Gimple ............... B25J 19/0029
                                                    239/290
6,641,667 B2 * 11/2003 Ochiai .................. B05B 7/1263
                                                    118/321
(Continued)

FOREIGN PATENT DOCUMENTS

CN        113696636 A    11/2021
EP         3535062 B1     5/2020
(Continued)

*Primary Examiner* — Jethro M. Pence
(74) *Attorney, Agent, or Firm* — Greenberg Traurig, LLP

(57) ABSTRACT

[Problem to be solved] Provided is a painting robot capable of realizing at least one of improvement in movement performance, reduction of the influence of a water head pressure difference, and prevention of occurrence of a state in which the pressure cannot be adjusted by a first adjustment valve and a second adjustment valve.
[Means for solving the problems] The painting robot 10 comprises a robot arm R1 attaching the painting head unit 50 to the tip, a paint supply mechanism 70 disposed between the robot arm R1 and the painting head unit 50, and a control unit 100, the control unit 100 comprising a paint supply means 90, a paint supply control unit 140 that performs control of at least one actuation of the paint supply means 91, the first adjustment valve 92 and the second adjustment valve 93 so as to be a pressure set point read from the control memory 141, and controls operation of at least one of the paint supply means 90 and the paint recovery means 91 while adjusting the openness of the first adjustment valve 92 and the second adjustment valve 93 within a predetermined adjustment range when controlling the pressure of the paint to be a pressure set point.

4 Claims, 11 Drawing Sheets

(51) Int. Cl.
  *B05B 12/08* (2006.01)
  *B05B 15/58* (2018.01)
  *B25J 9/16* (2006.01)
  *B25J 11/00* (2006.01)
  *B25J 15/00* (2006.01)
(52) U.S. Cl.
  CPC ............. *B05B 15/58* (2018.02); *B25J 9/1664* (2013.01); *B25J 11/0075* (2013.01); *B25J 15/0019* (2013.01)

(56) References Cited

U.S. PATENT DOCUMENTS

| | | | | |
|---|---|---|---|---|
| 6,835,248 | B1* | 12/2004 | Haas | B05B 13/0431 |
| | | | | 901/43 |
| 7,399,363 | B2* | 7/2008 | Clifford | B05B 13/0452 |
| | | | | 239/722 |
| 8,726,830 | B2* | 5/2014 | Herre | B05B 13/0292 |
| | | | | 901/49 |
| 8,881,672 | B2* | 11/2014 | Fischer | B05B 5/0426 |
| | | | | 118/313 |
| 9,248,465 | B2* | 2/2016 | Ribeiro | B05C 15/00 |
| 9,289,791 | B2* | 3/2016 | Uematsu | B05C 5/0216 |
| 9,616,446 | B2* | 4/2017 | Hirota | B05B 15/58 |
| 9,931,658 | B2* | 4/2018 | Hofschulte | B05D 1/02 |
| 9,956,567 | B2* | 5/2018 | Albrecht | B24C 1/003 |
| 9,956,569 | B2* | 5/2018 | Jimenez Ramos | B05B 13/041 |
| 9,956,570 | B2* | 5/2018 | Friedel | B05B 16/40 |
| 9,956,574 | B2* | 5/2018 | Schwab | B25J 21/00 |
| 9,962,722 | B1* | 5/2018 | Sute | B05C 11/1044 |
| 10,239,073 | B2* | 3/2019 | Jin | B05B 15/50 |
| 10,974,268 | B2* | 4/2021 | Jones | G08B 7/06 |
| 11,084,058 | B2* | 8/2021 | de Borchgrave | B01D 47/025 |
| 11,219,916 | B2* | 1/2022 | Shiwa | B05B 15/70 |
| 11,413,877 | B2 | 8/2022 | Mellin et al. | |
| 11,633,752 | B2* | 4/2023 | de Borchgrave | B05B 14/468 |
| | | | | 118/326 |
| 11,701,678 | B1* | 7/2023 | Stasiak | B25J 9/1674 |
| | | | | 427/427.2 |
| 11,845,095 | B2* | 12/2023 | Rodrigues | B05B 1/086 |
| 11,845,270 | B2* | 12/2023 | Tawata | B05B 12/04 |
| 11,872,686 | B2* | 1/2024 | Konno | B25J 9/0084 |
| 11,878,316 | B2* | 1/2024 | de Borchgrave | B01D 46/0006 |
| 12,157,237 | B2* | 12/2024 | Tawata | B25J 9/1697 |
| 2006/0261192 | A1* | 11/2006 | Haas | B05B 13/0431 |
| | | | | 239/533.1 |
| 2015/0047562 | A1* | 2/2015 | Hirota | B05C 5/0279 |
| | | | | 118/313 |
| 2018/0221902 | A1* | 8/2018 | Hofschulte | B05B 12/02 |
| 2021/0362178 | A1 | 11/2021 | Mellin et al. | |
| 2022/0168767 | A1* | 6/2022 | Shibayama | B05B 7/1626 |
| 2022/0168769 | A1 | 6/2022 | Rodrigues et al. | |
| 2022/0274398 | A1 | 9/2022 | Tawata | |
| 2022/0274420 | A1 | 9/2022 | Hozumi et al. | |
| 2023/0100988 | A1* | 3/2023 | Tawata | B05C 11/1018 |
| | | | | 427/427.2 |
| 2023/0134252 | A1* | 5/2023 | Tawata | B41J 2/19 |
| | | | | 239/71 |
| 2025/0135480 | A1* | 5/2025 | Koch | G05B 23/024 |

FOREIGN PATENT DOCUMENTS

| | | |
|---|---|---|
| JP | 2017121794 A | 7/2017 |
| JP | 2020501883 A | 1/2020 |
| JP | 2021071240 A | 5/2021 |
| JP | 2021183417 A | 12/2021 |
| WO | 2021028983 A1 | 2/2021 |
| WO | 2021033308 A1 | 2/2021 |
| WO | 2021-040034 A1 | 3/2021 |
| WO | 2021040005 A1 | 3/2021 |
| WO | 2021205537 A1 | 10/2021 |
| WO | 2022049718 A1 | 3/2022 |

* cited by examiner

Fig.10

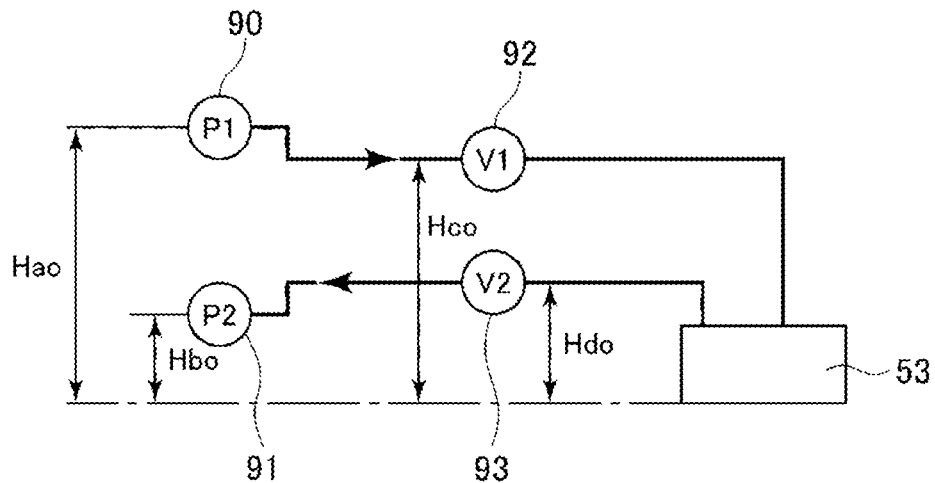

Fig.11

|  | Supply Pump Corrected Pressure Setpoint | Suction Pump Corrected Pressure Setpoint | First Paint Regulator Corrected Pressure Setpoint | Second Paint Regulator Corrected Pressure Setpoint |
|---|---|---|---|---|
| Stage 1 | $-\Delta SPa1$ | $-\Delta SPb1$ | $-\Delta SPc1$ | $-\Delta SPd1$ |
| Stage 2 | $-\Delta SPa2$ | $-\Delta SPb2$ | $-\Delta SPc2$ | $-\Delta SPd2$ |
| Stage 3 | $-\Delta SPa3$ | $-\Delta SPb3$ | $-\Delta SPc3$ | $-\Delta SPd3$ |
| Stage 4 | $-\Delta SPa4$ | $-\Delta SPb4$ | $-\Delta SPc4$ | $-\Delta SPd4$ |
| Stage 5 | $-\Delta SPa5$ | $-\Delta SPb5$ | $-\Delta SPc5$ | $-\Delta SPd5$ |

Fig.13
(A)
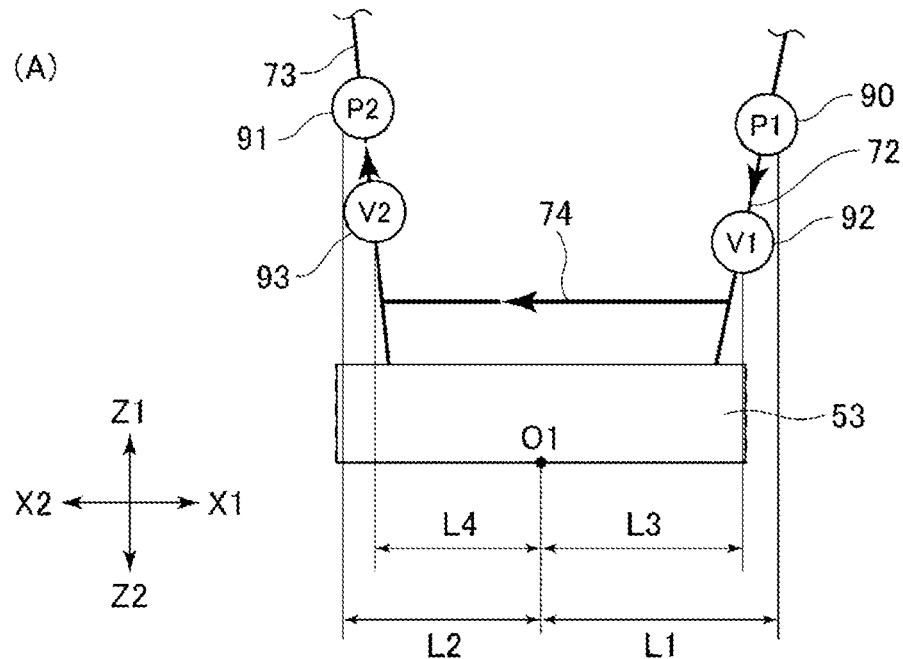
(B)
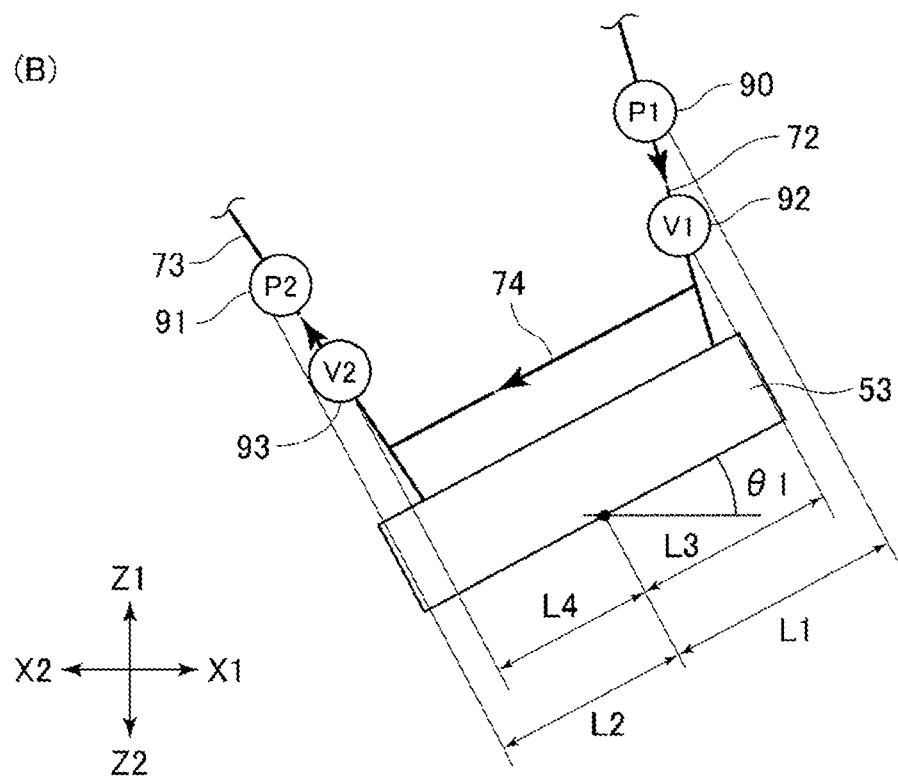

PAINTING ROBOT

TECHNICAL FIELD

The present invention relates to painting robots.

BACKGROUND ART

Robotic painting is the mainstream in the painting line of vehicles such as automobiles. As an example of this robotic painting configuration, for example, Patent Literature 1 discloses the following configuration: That is, in the painting robot disclosed in Patent Literature 1, a circulation device (200) is attached to the tip side of the robot arm (100). A first proportional control valve (204) and a second proportional control valve (205) are provided in the circulation device (200), a plurality of pressure sensors (208 to 211) are provided, and a flow meter (212) is provided. In addition, the supply pressure and recovery pressure are adjusted by controlling the openness of the first proportional control valve (204) and the second proportional control valve (205) according to the control mode of whether the flow rate is constant or the differential pressure is constant when the attitude of the circulation device (200) changes, thereby realizing control according to the above control mode.

PRIOR ART DOCUMENTS

[Patent Literature 1] WO2021/040034 Publication

SUMMARY OF THE INVENTION

Problem to be Solved by the Invention

By the way, in the configuration disclosed in Patent Literature 1, it is possible to reduce the effect of the hydrocephalus pressure difference in the circulation device (200) attached to the tip side of the robot arm. However, in Patent Literature 1, no mention is made of the circulation device mounted on the robot arm side. Therefore, it is unclear how to reduce the effects of the hydrocephalus pressure difference and perform stable painting in the event of a hydrocephalus pressure difference between the circulation device mounted on the robot arm side and the discharge head attached to the tip of the robot arm.

In addition, in Patent Literature 1, if the first proportional control valve (204) and the second proportional control valve (205) are fully open or fully closed, pressure adjustment becomes impossible.

Also, in a configuration in which a circulation device is attached to the tip side of the robot arm, it is difficult to improve the motor performance in the robotic painting.

The present invention is based on the above circumstances and is directed to providing a painting robot capable of achieving at least one of: (1) improving motor performance when painting; (2) reducing the effect of hydrocephalus pressure differentials between a circulation device mounted on the robot arm side and an ejection head mounted on the tip of the robot arm to provide a stable painting; and (3) preventing a condition in which pressure cannot be adjusted by the first and second adjustment valves.

Means for Solving the Problems

In order to solve the above problems, according to a first aspect of the invention, A painting robot characterized by the following is provided. A painting robot for painting an object comprises: a plurality of nozzles ejecting droplets; a painting head unit comprising a painting head comprising a piezoelectric substrate for driving droplets out of the nozzle; the painting head unit attached to the tip, a robotic arm to move the painting head unit to a desired position; a paint supply mechanism provided between a robot arm and a painting head unit; a control unit controlling the drive of the robot arm and the paint supply mechanism; the paint supply mechanism includes: a paint supply channel for supplying paint to a painting head; connected to the paint discharge side of the painting head; a return channel for recovering paint not dispensed from the nozzle; mounted in place of the robot arm, which is installed in the middle of the paint supply line; a paint supply means for applying pressure to supply paint to a painting head based on control at a control portion; mounted in place of the robot arm; in the middle of the return channel, a paint recovery means for applying pressure to a downstream side of a return channel for recovering paint not dispensed from the painting head based on the control at the control portion provided in a painting head unit, which is provided by the downstream of the paint supply channel rather than the paint supply means; and a first adjustment valve to adjust the pressure of the paint towards the painting head based on control at the control; provided in a painting head unit, on the upstream side of the return channel rather than the paint recovery means; a second adjustment valve to adjust the pressure of paint recovered from the painting head based on control at the control. The control unit includes: a control memory in which the pressure setpoint is stored; and paint supply means to be a pressure set point read from the control memory; paint recovery means, a paint supply control that performs control of at least one actuation of a first adjustment valve and a second adjustment valve. When controlling the pressure of the paint to be the pressure set point at the paint supply control, adjusting the openness of the first and second adjustment valves within a range having a predetermined adjustment charge; controlling operation of at least one of the paint supply means and the paint recovery means.

Further, in the above invention, a first pressure sensor for detecting the pressure of the paint discharged from the paint supply means at least downstream of the paint supply means in the paint supply channel; a second pressure sensor that detects the pressure of paint that has passed through the first regulating valve on the downstream side; a third pressure sensor that detects the pressure of the paint discharged from the second regulating valve at least downstream of the second regulating valve in the return channel; a fourth pressure sensor that detects the pressure of the paint discharged from the paint collecting means at least downstream of the paint collecting means in the return channel; and the paint supply control unit, based on the detection result of at least one of the first pressure sensor, the second pressure sensor, the third pressure sensor, and the fourth pressure sensor. The paint supply means and paint collection means are adjusted so that the paint pressure reaches the pressure set by the set pressure value. Preferably, controlling the actuation of at least one of the first regulating valve and the second regulating valve is performed.

Also, in the above invention, preferably, the control memory is stored in a control table having a plurality of pressure set points set for each plurality of control conditions, wherein the control table is provided with a plurality of pressure set points for each of the paint supply means, the paint recovery means, the first adjustment valve and the second adjustment valve.

In addition, in the above invention, preferably, the painting head is provided with angle sensing means to detect the angle of inclination of the painting head, wherein the control table is provided with a pressure set point for each angle of inclination of the painting head, wherein the paint supply control selects a pressure set point from the control table corresponding to the angle of inclination of the painting head detected by the angle sensing means, and wherein the paint supply control performs control of at least one actuation of the paint supply means, paint recovery means, first adjustment valve, and second adjustment valve based on the selected pressure set point.

Also, in the above invention, preferably, the control table is provided with a pressure set point for each coordinate data of the robot arm, wherein the paint supply control portion selects a pressure set point from the control table corresponding to the coordinate position based on the current coordinate position of the robot arm, and wherein the paint supply control portion performs control of the operation of at least one of the paint supply means, paint recovery means, the first adjustment valve and the second adjustment valve based on the selected pressure set point.

Effect of the Present Invention

According to the present invention, a painting robot can be provided so that it can provide stable vehicle painting by reducing the effect of hydrocephalus pressure differentials between a circulation device mounted on the robot arm side and an ejection head mounted on the tip of the robot arm.

BRIEF DESCRIPTION OF THE DRAWINGS

FIG. 10 A diagram showing an image of hydrocephalus pressure in a direction along the paint channel when the robot arm is generally level in the painting robot shown in FIG. 1.

FIG. 11 A diagram showing an example of a control table with multiple compensation pressure settings in the painting robot shown in FIG. 1.

FIG. 13 In the painting robot shown in FIG. 1, a diagram showing the condition before and after the painting head is tilted relative to a direction orthogonal to the direction of the paint channel, (A) showing the condition before the painting head is tilted, and (B) showing the condition after the painting head is tilted.

DETAILED DESCRIPTION OF THE EMBODIMENTS

A painting robot 10 according to each embodiment of the present invention will be described below with reference to the drawings. In the following description, if necessary, the X direction is the longitudinal direction of the nozzle forming surface 52 (painting head 53), the X1 side is the right side in FIG. 2, and the X2 side is the left side in FIG. 2. The Y direction is the short direction (width direction) of the nozzle forming surface 52 (painting head 53), the Y1 side is the upper side of the paper surface in FIG. 2, and the Y2 side is the lower side of the paper surface in FIG. 2.

The painting robot 10 of the present embodiment is intended to "paint" an object, such as a vehicle or vehicle part located on a painted line in a car manufacturing plant (hereinafter described as a vehicle as well as a vehicle part of the vehicle), and to form a coating film on the surface of the painted object to provide protection and aesthetics to the surface. Therefore, it is necessary to paint vehicles moving along the painting line at predetermined time intervals with a desired painting quality within a certain period of time.

In addition, in the painting robot 10 of the present embodiment, not only the above-described coating film can be formed, but various designs and images can be formed for painted objects such as vehicles and vehicle parts. It should be noted that the subject matter of painting is not limited to vehicles and vehicle parts, but it is acceptable if it is necessary to paint various parts other than automobiles (for example, exterior parts of airplanes and railways).

1-1. Overall Configuration of Inkjet Coating Machines for Vehicles

Figure 1:
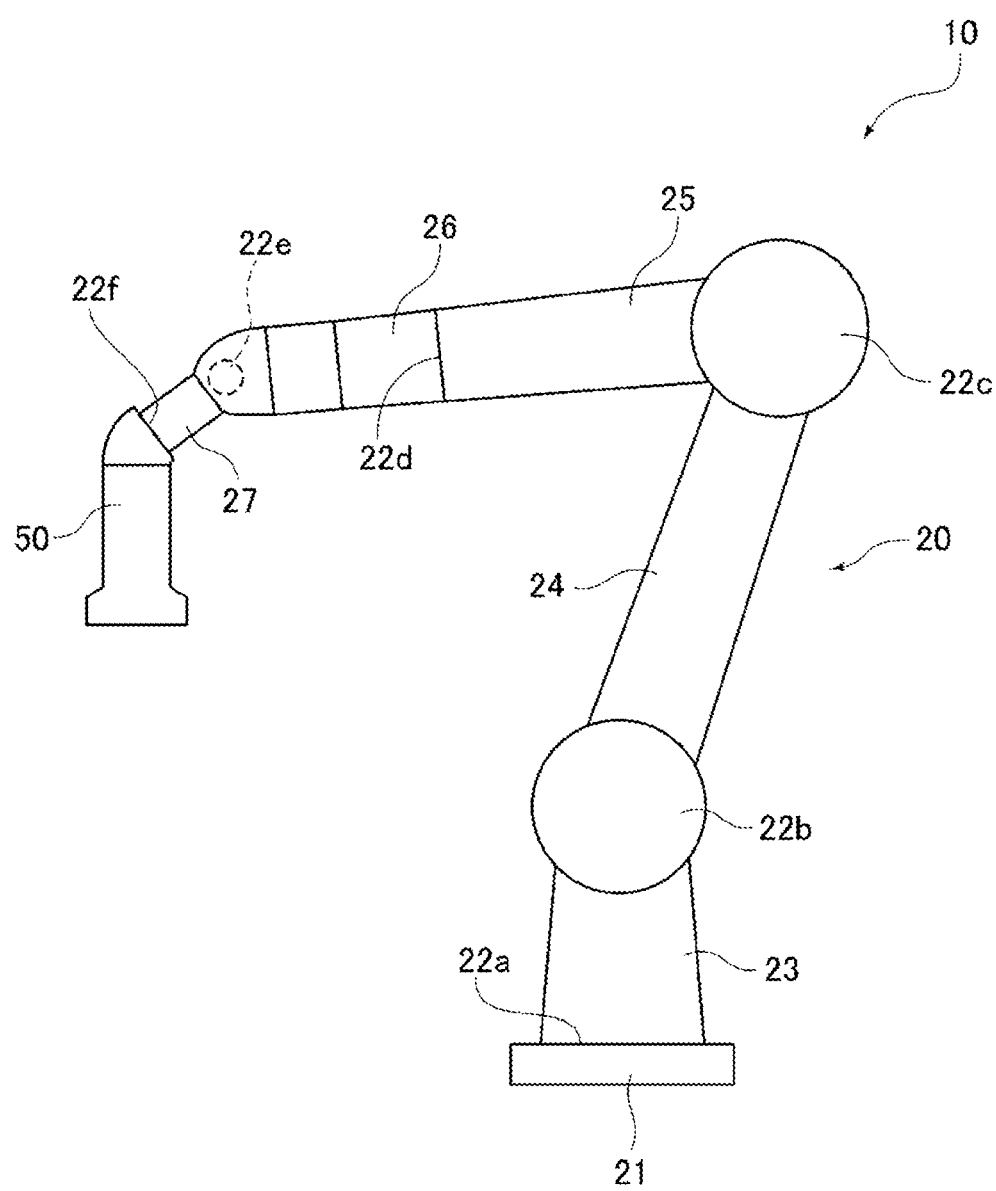
FIG. 1 A schematic diagram showing the overall configuration of a painting robot according to one embodiment of the present invention.

FIG. 1 is a schematic diagram illustrating an overall configuration of a painting robot 10 according to the first embodiment of the present invention. As shown in FIG. 1, the painting robot 10 has a robot main body 20 and a painting head unit 50 as main components. Although the painting robot 10 shown in FIG. 1 shows a six-axis vertical articulation robot as an example thereof, the painting robot 10 may be any type of robot, such as a non-six-axis vertical articulation, horizontal articulation, orthogonal robot, etc.

1-2. About the Main Body of Painting Equipment

As shown in FIG. 1, the robot body 20 uses base 21, rotational axes 22a-22f, legs 23, first movement arm 24, second movement arm 25, rotating arm 26, wrist portion 27, and an unillustrated motor for driving them as the main components. The portion from the leg 23 to the wrist portion 27 corresponds to the robot arm R1, but other portions such as the base 21, etc. may also correspond to the robot arm R1.

Among these, the base 21 is a portion to be installed on an installation site such as a floor surface, but the base 21 may be movable with respect to the installation site. Also, the leg portion 23 is a portion erected upward from the base 21, and is rotated with respect to the base 21 via the first rotational axis 22a by being driven by a motor (first motor) not shown. In addition, the leg portion 23 may be configured so as not to rotate with respect to the base 21.

Also, at the upper end of the leg 23, the first movement arm 24 is rotatably provided via the second rotational axis 22b by a drive of the motor (second motor) which is omitted from the illustration. Further, on the tip side of the first movement arm 24, the second movement arm 25 is rotatably provided via the third rotational axis 22c by means of a drive of the motor (third motor), which is omitted in the illustration.

Also, on the tip side of the second movement arm 25, the rotation arm 26 is rotatably provided about the center axis of the second movement arm 25. This rotating arm 26 is rotatable via a fourth rotational axis 22d by driving a motor (fourth motor) that is omitted from the illustration. In addition, a wrist portion 27 is provided on the tip side of the rotating arm 26. This wrist portion 27 allows for rotational movement around multiple (e.g., two) axes of different orientations. In FIG. 1, the rotational axis capable of rotational movement thereof is set to a fifth rotational axis 22e and a sixth rotational axis 22f, respectively. As a result, the orientation of the painting head unit 50 can be controlled with high accuracy. It should be noted that the number of axes may be any number as long as it is two or more.

In addition, a painting head unit 50 is attached to the wrist portion 27, but the painting head unit 50 may be provided detachably from the wrist portion 27.

1-3. About Painting Head Unit

Figure 2:
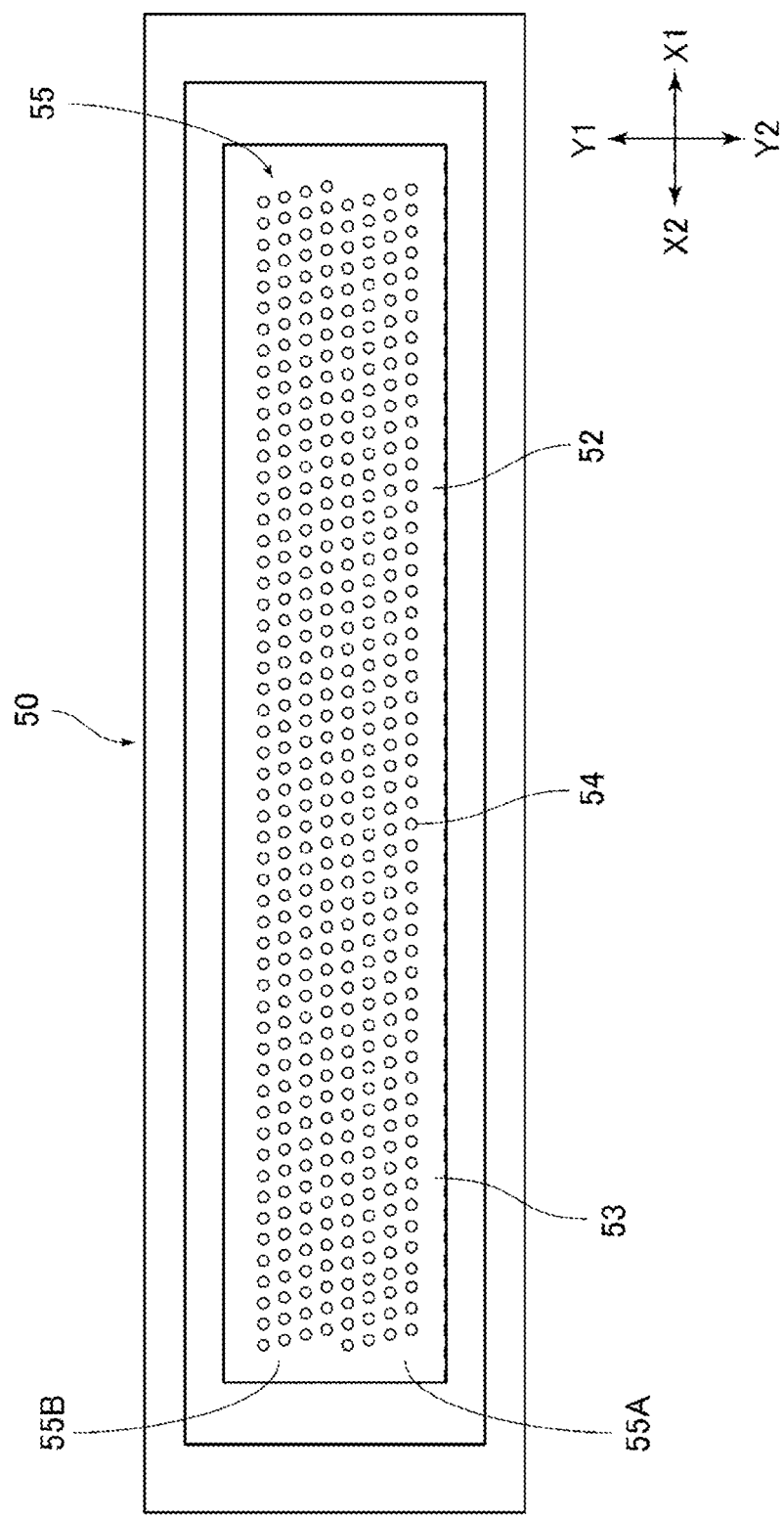
FIG. 2 A diagram showing the nozzle forming surface for ejecting paint from among the painting robots shown in FIG. 1.

The painting head unit 50 will then be described. FIG. 2 is a diagram illustrating a front view of a nozzle forming surface 52 for dispensing paint out of the painting head unit 50. As shown in FIG. 2, the painting head unit 50 comprises a head cover (not shown), and various components are built in the head cover. As shown in FIG. 2, the nozzle forming surface 52 is provided with a plurality of nozzle rows 55 in which the nozzles 54 are inclined relative to the longitudinal direction of the painting head unit 50. Such a nozzle row 55 is provided in the present embodiment with a first nozzle row 55A present on one side (Y2 side) of the main scanning direction (Y direction) and a second nozzle row 55B present on the other side (Y1 side) of the main scanning direction.

Note that when the paint is to be ejected, the drive timing of each nozzle 54 is controlled such that between droplets ejected from the adjacent nozzle 54 in the first nozzle row 55A, droplets ejected from the nozzle 54 in the second nozzle row 55B are expelled. As a result, the dot density can be improved painting.

Figure 3:
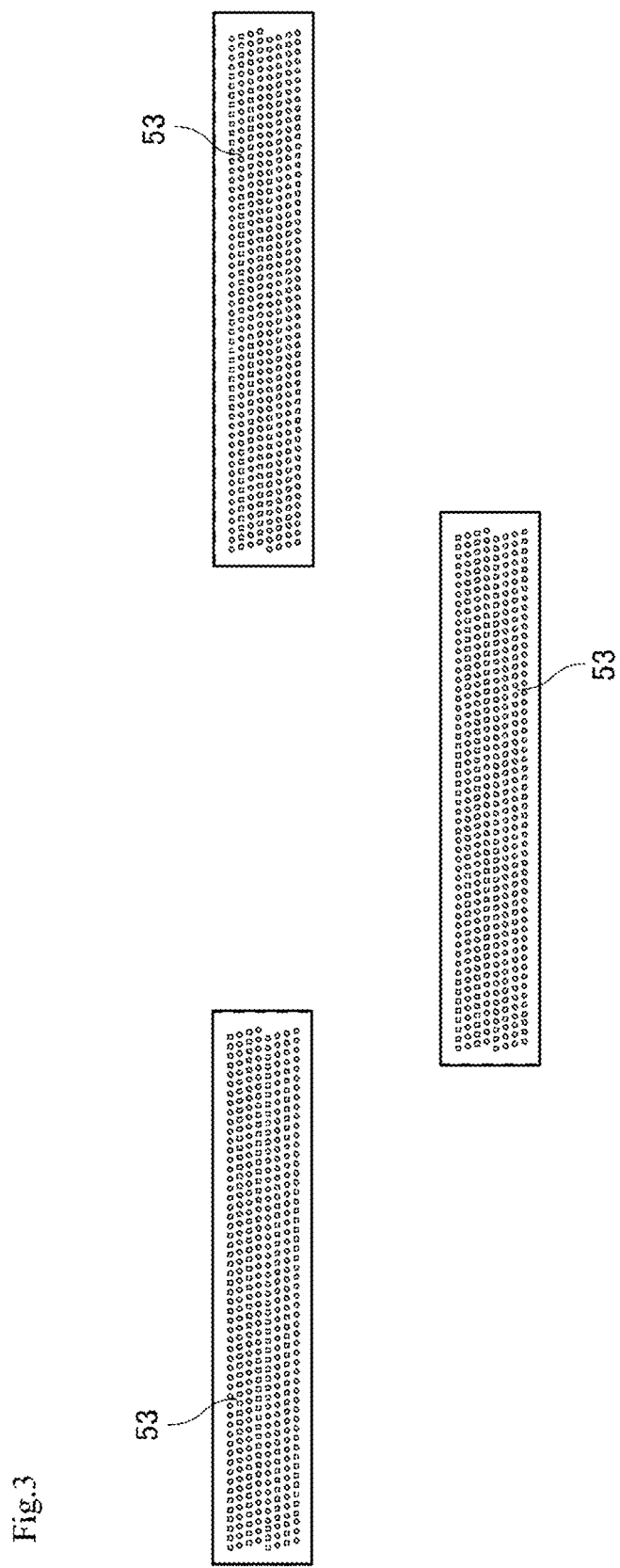
FIG. 3 A diagram showing the state in which multiple painting heads are arranged in a staggered shape in the painting robot shown in FIG. 1.

By the way, as shown in FIG. 2, there is a single painting head 53 in the nozzle forming surface 52. However, the nozzle forming surface 52 may have a head group consisting of a plurality of painting heads 53. In this case, the configuration of positioning of the plurality of painting heads 53 in a staggered manner while aligning the painting heads as shown in FIG. 3 can be offered as an example but the arrangement of the painting heads 53 in the head group may not be staggered.

Figure 4:
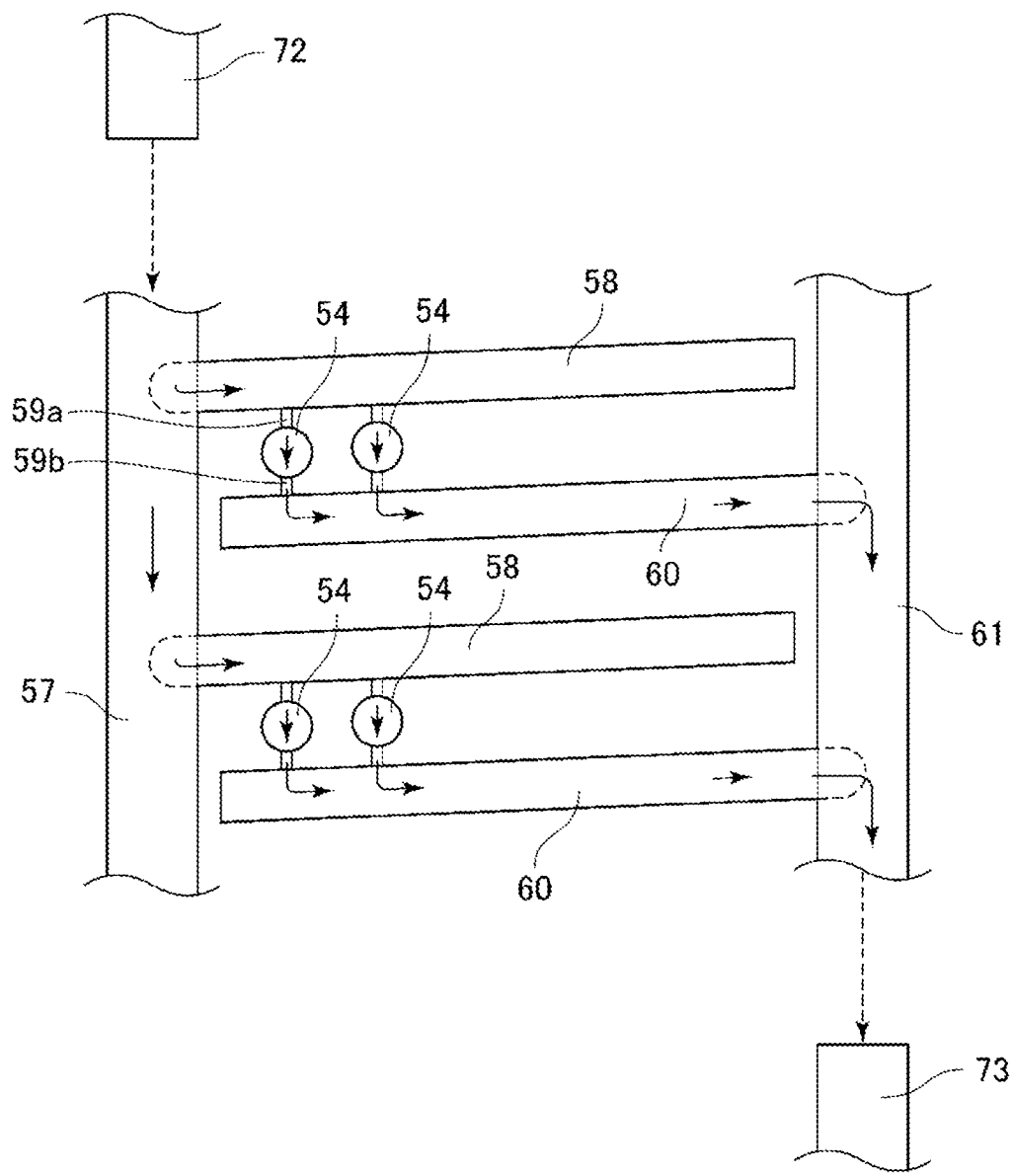
FIG. 4 A diagram showing a schematic configuration of supplying paint to each nozzle in the painting robot shown in FIG. 1.
Figure 5:
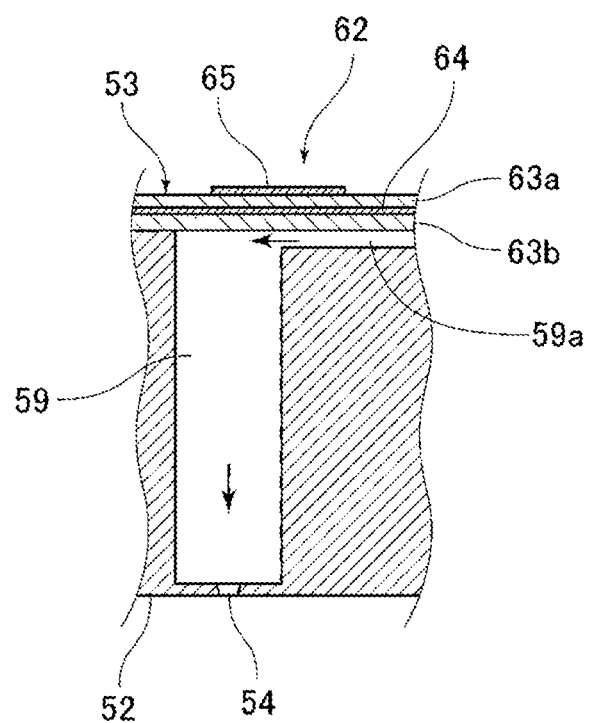
FIG. 5 A cross-sectional view showing the configuration near the row-directed supply channel, nozzle pressurization chamber, and row-directed discharge channel shown in FIG. 4.

FIG. 4 is a diagram illustrating a schematic configuration of providing paint to each nozzle 54. FIG. 5 is a cross-sectional view showing a configuration near a row-directed supply channel 58, nozzle pressurization chamber 59, and a row-directed discharge channel 60. As shown in FIGS. 4 and 5, the painting head 53 includes a supply side major channel 57, a row-directed supply channel 58, a nozzle pressurization chamber 59, a row-directed discharge channel 60, and a discharge side major channel 61. The supply side major channel 57 is a channel through which paint is supplied from the paint supply channel 72 of the paint supply mechanism 70 described below. Also, row-directed supply channel 58 is a channel in which the paint in the supply side major channel 57 is diverted.

The nozzle pressurization chamber 59 is also connected via a row-directed supply channel 58 and a nozzle supply channel 59a. Thereby, the nozzle pressurization chamber 59 is supplied with the paint from the row feeding channel 58. This nozzle pressurization chamber 59 is provided corresponding to the number of nozzles 54 and the internal paint can be ejected from the nozzles 54 using the piezoelectric substrate 62 described below.

The nozzle pressurization chamber 59 is also connected to the row-directed discharge channel 60 via the nozzle discharge channel 59b. Thus, the paint not dispensed from the nozzle 54 is discharged from within the nozzle pressurization chamber 59 into the row-directed discharge channel 60 via the nozzle discharge channel 59b. The row-directed discharge channel 60 is also connected to the discharge side major channel 61. The discharge side major channel 61 is a channel through which the discharged paint merges from the respective row-directed discharge channel 60. This discharge channel 61 is connected to a return channel 73 of the paint supply mechanism 70 as described below.

With such a configuration, the paint supplied from the paint supply channel 72 of the paint supply mechanism 70 described below is ejected from the nozzle 54 via the supply side major channel 57, the row-directed supply channel 58, the nozzle supply channel 59a and the nozzle pressurization chamber 59. The paint not dispensed from nozzle 54 is also returned from the nozzle pressurization chamber 59 through nozzle discharge channel 59b, row-directed discharge channel 60 and discharge side major channel 61 to return channel 73 of the paint supply mechanism 70 as described below.

In the configuration shown in FIG. 4, one row-directed supply channel 58 is arranged such that one row-directed discharge channel 60 corresponds. However, one row-directed supply channel 58 may be arranged such that multiple (e.g., two) row-directed discharge channels 60 correspond. Also, one row-directed discharge channel 60 may be arranged so as to correspond to a plurality of row-directed supply channels 58.

Also, as shown in FIG. 5, a piezoelectric substrate 62 is disposed on the top surface of the nozzle pressurization chamber 59 (the side opposite the nozzle 54). The piezoelectric substrate 62 comprises two piezoelectric ceramic layers 63a, 63b, which are piezoelectrics, and further comprises a common electrode 64 and an individual electrode 65. The piezoelectric ceramic layers 63a, 63b are stretchable members by applying a voltage from the outside. As such piezoelectric ceramic layers 63a, 63b, ceramic materials such as lead zirconate titanate (PZT)-based, NaNbO3-based, BaTiO3-based, (BiNa)NbO3-based, BiNaNb5O15-based can be used with ferroelectric properties.

Also, as shown in FIG. 5, a common electrode 64 is disposed between the piezoelectric ceramic layer 63a and the piezoelectric ceramic layer 63b. In addition, a surface electrode (not shown) for a common electrode is formed on the top surface of the piezoelectric substrate 62. The common electrode 64 and the surface electrode for common electrode are electrically connected through a conductor (not shown) present in the piezoelectric ceramic layer 63a. The individual electrodes 65 are also each disposed at a site opposite the nozzle pressurization chamber 59 described above. Furthermore, the portion of the piezoelectric ceramic layer 63a sandwiched between the common electrode 64 and the individual electrode 65 is polarized in the thickness direction. Therefore, upon application of voltage to the individual electrodes 65, the piezoelectric effect distorts the piezoelectric ceramic layer 63a. Therefore, applying a predetermined drive signal to the individual electrodes 65 causes the piezoelectric ceramic layer 63b to fluctuate relatively to reduce the volume of the nozzle pressurization chamber 59, thereby ejecting the paint.

Although the common electrode 64 is disposed on the top surface of the nozzle pressurization chamber 59 in FIG. 5, the common electrode 64 is not limited to the configuration disposed on the top surface of the nozzle pressurization chamber 59 as shown in FIG. 5. For example, the common electrode 64 may adopt a configuration in which it is arranged on the side surface of the nozzle pressurizing chamber 59 (a surface orthogonal or substantially orthogonal to the top surface). In addition, any configuration may be adopted as long as the paint can be discharged well from the nozzle 54.

1-4. Other Configurations of Painting Head Units

Figure 6:
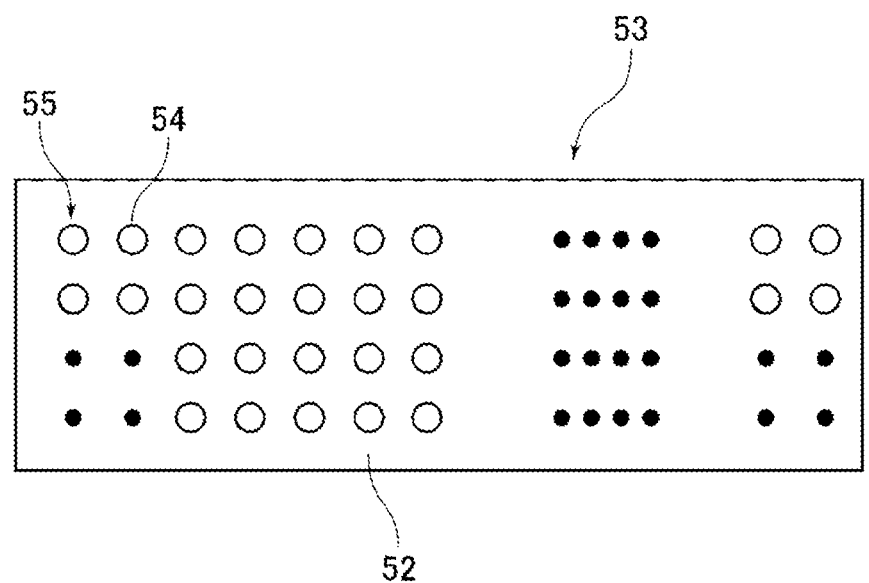
FIG. 6 A plan view showing the configuration of the nozzle forming surface in other painting head units different from the painting head unit shown in FIG. 2.

Other configurations of the painting head unit 50 will now be described. FIG. 6 is a plan view illustrating the configuration of the nozzle forming surface 52 of other painting head units 50. As shown in FIG. 6, multiple nozzles 54 may be aligned along the short direction (width direction; Y direction) of the painting head 53 to configure the nozzle row 55. Although in the configuration shown in FIG. 6, the plurality of nozzles 54 constitutes a row of nozzles 55 in line with the short direction (width direction; main scanning direction) of the painting head 53, only one (single) nozzle 54 may be arranged in the short direction (width direction; main scanning direction) of the painting head 53. That is, the nozzle row 55 may be comprised of one nozzle 54.

Also, when painting the vehicle with the painting head 53 as shown in FIG. 6, the painting may be performed with the longitudinal direction of the painting head 53 slightly tilted relative to the main scanning direction of the painting head 53. For example, in the configuration of the painting head 53 shown in FIG. 2, if the nozzle row 55 is inclined by an angle α relative to the main scanning direction, the longitudinal direction of the painting head 53 may be inclined by an angle α relative to the main scanning direction of the painting head 53. When tilting in this way, the painting head 53 shown in FIG. 2 can be achieved by simply adjusting the paint ejection timing from each nozzle 54.

1-5. About Paint Supply Mechanisms

Next, the paint supply mechanism 70 and the air bubble removal member and flow meter provided in the paint supply mechanism 70 will be described.

Figure 7:
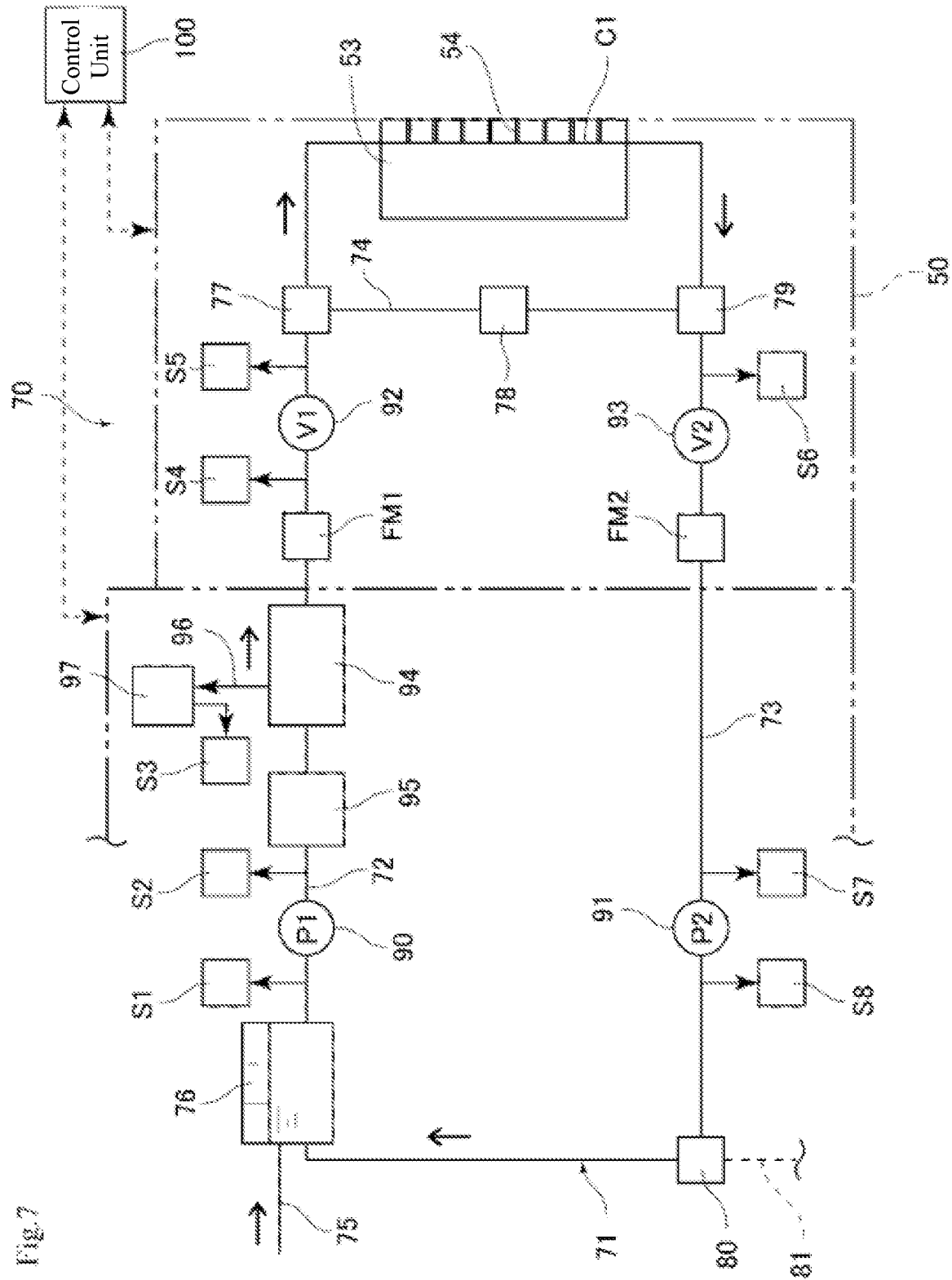
FIG. 7 A diagram showing a schematic configuration of a paint supply mechanism, etc. provided by a painting robot shown in FIG. 1.

FIG. 7 is a diagram illustrating a schematic configuration, such as a paint supply mechanism 70. The paint supply mechanism 70 consists of a paint circulation channel 71, an external supply channel 75, a bubble removal member 76, a supply pump 90, a suction pump 91, a first paint regulator 92, a second paint regulator 93, a degassing module 94, a removal filter 95, a pressure sensor S1-S8, a first flow meter FM1, and a second flow meter FM2 as the main components.

Paint circulation channel 71 is a channel for circulating paint and includes a paint supply channel 72, a return channel 73, and a bypass channel 74. Paint supply channel 72 is a channel for supplying paint supplied from external supply channel 75 or returned from return channel 73 towards painting head 53 and is connected to supply side channel 57 described above.

Return channel 73 is a channel for returning paint that is connected to discharge side major channel 61 of painting head 53 and not dispensed at painting head 53 back to bubble removal member 76.

The bypass channel 74 is a channel connecting the paint supply channel 72 and the return channel 73. That is, if the bypass channel 74 is provided in parallel with the painting head 53 and paint is not dispensed from the painting head 53, the paint is flowed to this bypass channel 74 by switching the operation of the three-way valve 77 described below.

The external supply channel 75 is a conduit for supplying the paint from a storage site side of a paint, such as a circular tank, to an interior of the tank body of the bubble removal member 76.

The bubble removal member 76 is a member for removing air bubbles contained in the paint. This bubble removal member 76 is provided at a stable site where the pose outside of the robot arm R1 does not change. The air bubble removal member 76 is also able to supply paint to the paint supply channel 72 and is connected to the return channel 73 so as to supply paint from the return channel 73. The air bubble removal member 76 comprises an externally sealable tank body, which is provided with an outlet for exhausting gas from air bubbles accumulated therein.

The paint supply channel 72 is also connected to the three-way valve 77 downstream of the first paint regulator 92 described below. This three-way valve 77 is connected to the middle of the paint supply channel 72 and also to the bypass channel 74. Thus, when painting, the upstream and downstream sides are opened more than the three-way valve 77 of the paint supply channel 72 to supply paint to the painting head 53. On the other hand, if no paint is applied, the paint flows from the paint supply channel 72 to the bypass channel 74, but is switched so that no paint is supplied to the downstream side of the paint supply channel 72 (painting head 53 side).

Also, in the mid-section of the bypass channel 74 described above, an open/close valve 78 is provided. Actuating the opening and closing valve 78 allows paint to flow through the bypass channel 74.

In addition, a three-way valve 79 is connected to the downstream side of the bypass channel 74 rather than the open/close valve 78, and this three-way valve 79 is further connected to the upstream side of the return channel 73 (i.e., the painting head 53 side of the return channel 73) and the downstream side (i.e., the suction pump 91 side described later in the return channel 73). Thus, when painting is performed, the upstream and downstream sides are opened more than the three-way valve 79 of the return channel 73, and paint not dispensed from the painting head 53 flows downstream of the return channel 73. On the other hand, in the absence of painting, the three-way valve 79 is switched such that paint flowing through the bypass channel 74 flows through the downstream side of the return channel 73 (suction pump 91 side).

Also, of the return channel 73, a switching valve 80 is disposed downstream of the suction pump 91 described below. The switching valve 80 is also a three-way valve and is connected to the outlet 81 other than the upstream and downstream sides of the return channel 73. This switching valve 80 is in the normal state, with paint flowing upstream and downstream of the return channel 73. However, if, for example, the flushing liquid flows from the paint supply channel 72 to the return channel 73 via the painting head 53 or the bypass channel 74, the actuation of the switching valve 80 is switched, and the flushing liquid (waste liquid) described above is discharged through the discharge channel 81.

The return channel 73 is connected to the air bubble removal member 76 described above at a downstream side of the switching valve 80.

In addition, a supply pump 90 is connected to the middle of the paint supply channel 72. The supply pump 90 corresponds to the paint supply means. The supply pump 90 is a means for applying positive pressure to a paint flowing through the paint supply channel 72 towards a downstream side of the supply pump 90. As the supply pump 90, it is preferable to use a gear pump that can control the supply amount of paint by controlling the rotational speed. However, the supply pump 90 may use a pump other than the gear pump. This supply pump 90 is controlled by operation at the control section 100 described below. Thereby, operation of the supply pump 90 is controllable to be a predetermined pressure set point.

In addition, a suction pump 91 is connected to the middle of the return channel 73. The suction pump 91 corresponds to a paint recovery means. The suction pump 91 is a means of applying a negative pressure to a paint flowing through the return channel 73 upstream of the supply pump 90. As for the suction pump 91, it is preferable to use a gear pump that can control the supply amount of paint by controlling the rotational speed, similar to the supply pump 90 described above. However, the suction pump 91 may use a pump other than the gear pump. This suction pump 91 is also controlled by operation at the control section 100 described below. Thereby, operation of the suction pump 91 is controllable such that its downstream side is a predetermined pressure set point.

Also, at the paint supply channel 72, a first paint regulator 92 is disposed downstream of the supply pump 90. The first paint regulator 92 relieves pulsation at the supply pump 90 to supply paint at a constant pressure. Note that the first paint regulator 92 corresponds to the first adjustment valve. This first paint regulator 92 is controlled at the control unit 100 described below to allow the openness to be adjusted according to the control air pressure and electrical signal. This allows the pressure downstream of the first paint regulator 92 to be controlled to be a predetermined pressure set point in response to the pressure upstream of the first paint regulator 92.

Also, in the return channel 73, a second paint regulator 93 is disposed upstream of the suction pump 91. The second paint regulator 93 relieves pulsation at the suction pump 91 and draws paint at a constant pressure (negative pressure). Note that the second paint regulator 93 corresponds to the second adjustment valve. This second paint regulator 93 is also adjustable according to the control air pressure and electrical signal by controlling at the control unit 100 described below. This allows the pressure upstream of the second paint regulator 93 to be controlled to be a predetermined pressure set point in response to the pressure downstream of the second paint regulator 93.

Also, at the paint supply channel 72, a degassing module 94 is disposed downstream of the supply pump 90 and upstream of the first paint regulator 92. The degassing module 94 is disposed downstream of the paint supply channel 72 rather than the removal filter 95 described below, and is a member for removing (degassing) dissolved gases that are dissolved in the paint.

Also, in the paint supply channel 72, a removal filter 95 is disposed upstream of the degassing module 94 and downstream of the supply pump 90. The removal filter 95 removes foreign matter contained in the paint flowing through the paint supply channel 72. The removal filter 95 ensures that the painting head 53 continues to operate normally, for example by removing gross foreign matter and pigment aggregates from paints containing pigments.

Next, pressure sensors S1-S8 and flowmeters FM1, FM2 are described. In the paint supply channel 72, a pressure sensor S1 is disposed upstream of the supply pump 90. In addition, in the paint supply channel 72, a pressure sensor S2 is disposed downstream from the supply pump 90 and upstream from the removal filter 95. The pressure sensor S1 measures the supply pressure of paint to the supply pump 90 and sends the measurement results to the control unit 100. In addition, the pressure sensor S2 measures the pressure of the paint dispensed from the supply pump 90, and sends the measurement results to the control unit 100.

In this way, pressure sensors S1, S2 allow the estimated pressure of the supply pump 90 to be measured accurately by measuring the pressure of the paint upstream and downstream of the supply pump 90. It should be noted that the estimated pressure of the supply pump 90 may be the average value of the pressure value of the pressure sensor S1 and the pressure value of the pressure sensor S2, or may be the pressure value of either. The above estimated pressures are also used to calculate the hydrohead pressure and hydrohead pressure differentials described below.

The degassing module 94 described above is also connected to the vacuum pump 97 via the suction conduit 96. The vacuum pump 97 is an apparatus for depressurizing the interior of the housing of the degassing module 94 (the interior of the hollow fiber membrane), as described above. This decompression removes (degass) dissolved gases that are dissolved in the paint supplied to the housing.

The pressure sensor S3 also measures the pressure of the suction conduit 96 between the vacuum pump 97 and the degassing module 94 described above.

In the paint supply channel 72, a first flow meter FM1 is disposed downstream of the degassing module 94 and upstream of the first paint regulator 92. The first flow meter FM1 measures the flow rate of the paint fed to the first paint regulator 92 and transmits the measurement results to the control unit 100. Because this first flow meter FM1 is a contactless flow meter without moving parts, such as ultrasonic, optical, electromagnetic, thermal, etc., the first flow meter FM1 is installed outside the paint supply channel 72. Note that the first flow meter FM1 may use a flow meter that exists in the movable portion.

Here, when the first flow meter FM1 is of an optical type, at least a portion of the paint supply channel 72 where the flow rate is measured by the first flow meter FM1 is provided transparently. However, if the first flow meter FM1 is an ultrasonic method other than optical, the portion of the paint supply channel 72 measuring the flow rate at least at the first flow meter FM1 need not be provided transparent.

Also, in the paint supply channel 72, a pressure sensor S4 is disposed downstream of the first flow meter FM1 and upstream of the first paint regulator 92. Also, in the paint supply channel 72, a pressure sensor S5 is disposed downstream of the first paint regulator 92 and upstream of the three-way valve 77. The pressure sensor S4 measures the supply pressure of the paint to the first paint regulator 92 and sends the measurement results to the control unit 100. In addition, the pressure sensor S5 measures the pressure of the paint dispensed from the first paint regulator 92 and transmits the measurement results to the control unit 100.

In this way, pressure sensors S4, S5 allow the estimated pressure of the first paint regulator 92 to be measured accurately by measuring the pressure of the paint upstream and downstream of the first paint regulator 92. The estimated pressure of the first paint regulator 92 may be the average value of the pressure value of the pressure sensor S4 and the pressure value of the pressure sensor S5, or may be the pressure value of either.

Although it is preferable that the above pressure sensor S4 is provided in the paint supply mechanism 70, a configuration that omits this pressure sensor S4 may be employed. In addition, the pressure sensor S4 may be provided on the painting head unit 50 side, but it may be provided on the second movement arm 25 side (robot arm R1 side). The pressure sensor S4 may also be provided upstream of the first flow meter FM1.

Also, in the return channel 73, a pressure sensor S6 is disposed downstream of the three-way valve 79 and upstream of the second paint regulator 93. Also, in the return channel 73, a pressure sensor S7 is disposed further downstream of the flow meter FM2 (described below) downstream of the second paint regulator 93. The pressure sensor S6 measures the supply pressure of paint to the second paint regulator 93 and sends the measurement results to the control unit 100. The pressure sensor S7 also measures the pressure of the paint dispensed from the second paint regulator 93 (i.e., the pressure of the paint supplied to the suction pump 91) and sends the measurement results to the control unit 100.

In this way, pressure sensors S6, S7 allow the estimated pressure of the second paint regulator 93 to be measured accurately by measuring the pressure of the paint upstream and downstream of the second paint regulator 93. The estimated pressure of the second paint regulator 93 may be the average value of the pressure value of the pressure sensor S6 and the pressure value of the pressure sensor S7, or may be the pressure value of either one.

It should be noted that in return channel 73, the pressure sensor may be positioned downstream of second paint regulator 93 and upstream of flow meter FM2.

Also, in return channel 73, a second flow meter FM2 is disposed downstream of second paint regulator 93. The second flow meter FM2 measures the flow rate of the paint fed to the suction pump 91 and transmits the measurement results to the control unit 100. This second flow meter FM2, like the first flow meter FM1 described above, is also a contactless flow meter without any moving parts, such as ultrasonic, optical, electromagnetic, thermal, etc., so the description of that detail is omitted. It should be noted that the second flow meter FM2 may also use a flow meter that exists in the movable portion.

Also, in the return channel 73, a pressure sensor S8 is disposed downstream of the suction pump 91 and upstream of the switching valve 80 described above. The pressure sensor S8 measures the pressure of the paint delivered from the suction pump 91 and sends the measurement results to the control unit 100.

In this way, pressure sensors S7, S8 enable accurate measurement of the estimated pressure of the suction pump 91 by measuring the pressure of the paint upstream and downstream of the suction pump 91. The estimated pressure of the suction pump 91 may be the average value of the pressure value of the pressure sensor S7 and the pressure value of the pressure sensor S8, or may be the pressure value of either.

1-8. About the General Configuration of the Control Unit

Figure 8:
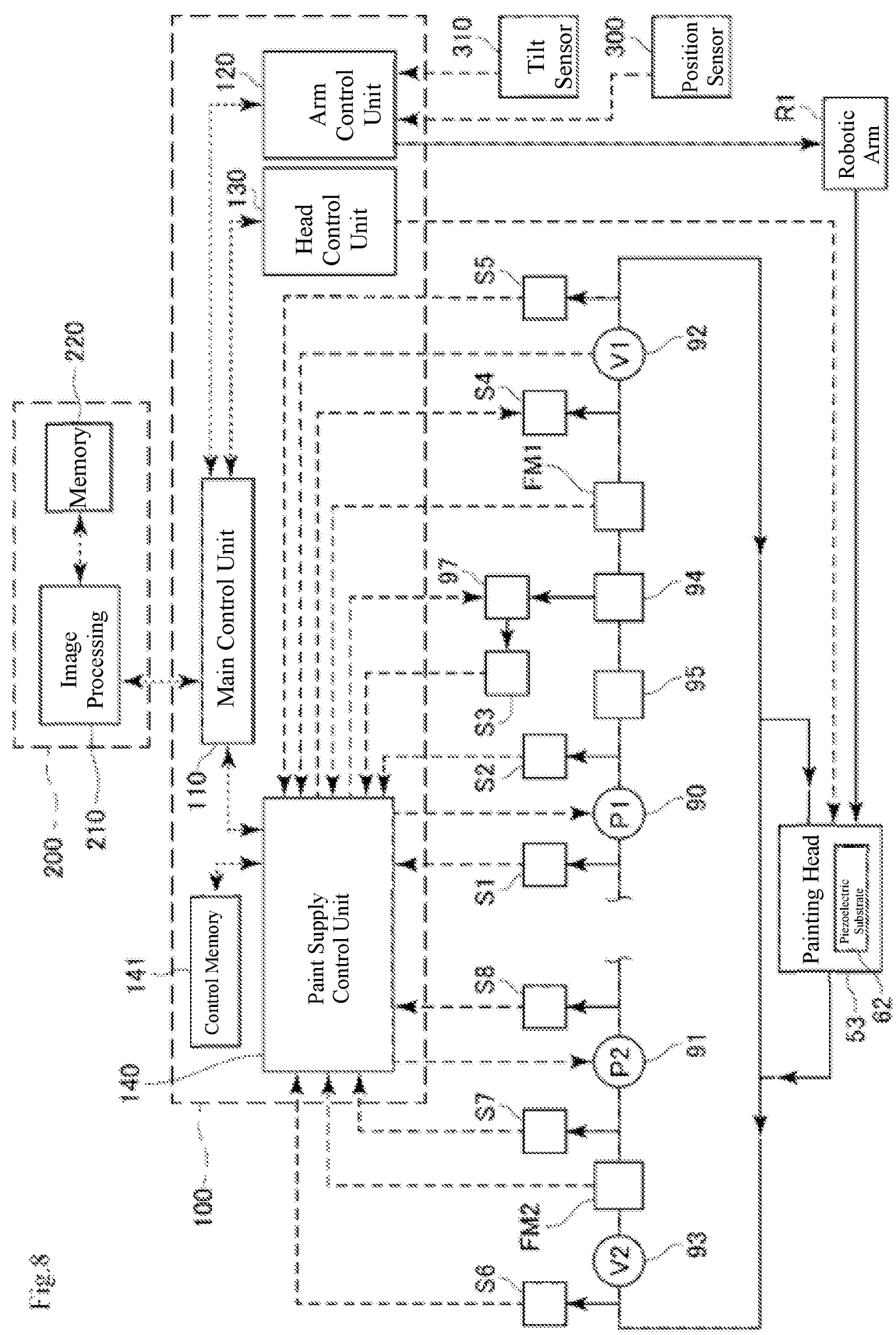
FIG. 8 A diagram showing a controlled schematic configuration centered on the control part of the painting robot shown in FIG. 1.

Next, a schematic configuration of a control portion 100 for controlling actuation of the painting robot 10 will be described. FIG. 8 is a diagram illustrating a controlled schematic configuration about a control portion 100 of the painting robot 10. As shown in FIG. 8, the control portion 100 is made up of the main control portion 110, the arm control portion 120, the head control portion 130, the paint supply control portion 140, the control memory 141, the position sensor 300, and the tilt sensor 310 as the main components. Further, the painting robot 10 is connected to the image processing device 200 to configure a painting robot system (reference numerals omitted).

The main control unit 110, the arm control unit 120, the head control unit 130, the paint supply control unit 140, and the image processing unit 210 described below are composed of a CPU (Central Processing Unit), a storage site (Read Only Memory (ROM), Random Access Memory (RAM), non-volatile memory, etc.), and other elements. The image processing unit 210 may use a GPU (Graphics Processing Unit) together with a CPU having excellent image processing performance or in place of the CPU.

Of the above-described control configuration, the main control unit 110 is a portion that transmits a predetermined control signal to the above-described arm control unit 120, head control unit 130, and paint supply control unit 140 such that each motor (first to sixth motor) of the robot arm R1, each actuation unit of the paint supply mechanism 70, and the piezoelectric substrate 62 cooperate to perform painting on the object.

The arm control unit 120 is also a portion that controls the drive of each motor (first to sixth motor) of the robot arm R1 described above. The arm control unit 120 is provided with an arm memory (not shown), and the arm memory stores information relating to the trajectory of the painting head 53, which is created by robot teaching in consideration of the coating width of the painting head 53 that can be coated. Data (trajectory data) and posture data relating to the posture such as inclination of the painting head 53 are stored.

Then, the arm control unit 120 controls each motor (first to sixth motors) of the robot arm R1 described above based on the trajectory data and posture data stored in the arm memory and image processing in the image processing unit 210, which will be described later. With that control, the painting head 53 can pass through the desired position for performing painting at a desired speed or stop at a predetermined position. The arm memory may be provided by the painting robot 10, but there is an arm memory (e.g., the memory 220 shown in FIG. 8) external to the painting robot 10, and it may be possible to send and receive information to the arm memory via wired or wireless communication means.

The head control portion 130 is also a portion that controls operation of the piezoelectric substrate 62 within the painting head unit 50 based on image processing at the image processing device 200. This head control unit 130 controls paint ejection based on split paint data corresponding to a position when it reaches a predetermined position in the trajectory data by means of a means to detect a position of the position sensor 300, the tilt sensor 310, etc. described below. In this case, the drive frequency of the piezoelectric substrate 62 is controlled to control the number of dots (number of droplets) ejected from the nozzle 54, or the voltage applied to the piezoelectric substrate 62 to control the size of droplets ejected from the nozzle 54, so that the film thickness of the vehicle is uniform.

The paint supply control unit 140 is also a part that controls the supply of paint to the painting head 53, and specifically controls the operation of each actuation site in the paint supply mechanism 70, such as the supply pump 90, suction pump 91, first paint regulator 92, second paint regulator 93, vacuum pump 97, three-way valves 77, 79, open/close valves 78, switching valves 80, and the like. At this time, the paint supply control portion 140 preferably controls the actuation of the actuation site, such as the above-described pump and valve, so that paint is supplied to the painting head 53 at a constant pressure. However, the paint supply control 140 may be able to control actuation of an actuation site, such as a pump or valve described above, such that paint is supplied to the painting head 53 at a constant flow rate.

Here, the paint supply control unit 140 is accessible to the control memory 141, and by such access, it is possible to read the pressure set value stored in the control memory 141, which will be described later.

The position sensor 300 is also a sensor that detects the current position of the painting head 53. As such position sensors 300, rotary encoders, resolvers, laser sensors, and various other sensors can be used. In addition, the tilt sensor 310 is a sensor that detects an angle of inclination of the painting head 53, and corresponds to an angle detection means. Such tilt sensors 310 can include, for example, gyro sensors, acceleration sensors, tilt sensors, and various other sensors.

Regarding Pressure Control

Figure 9:
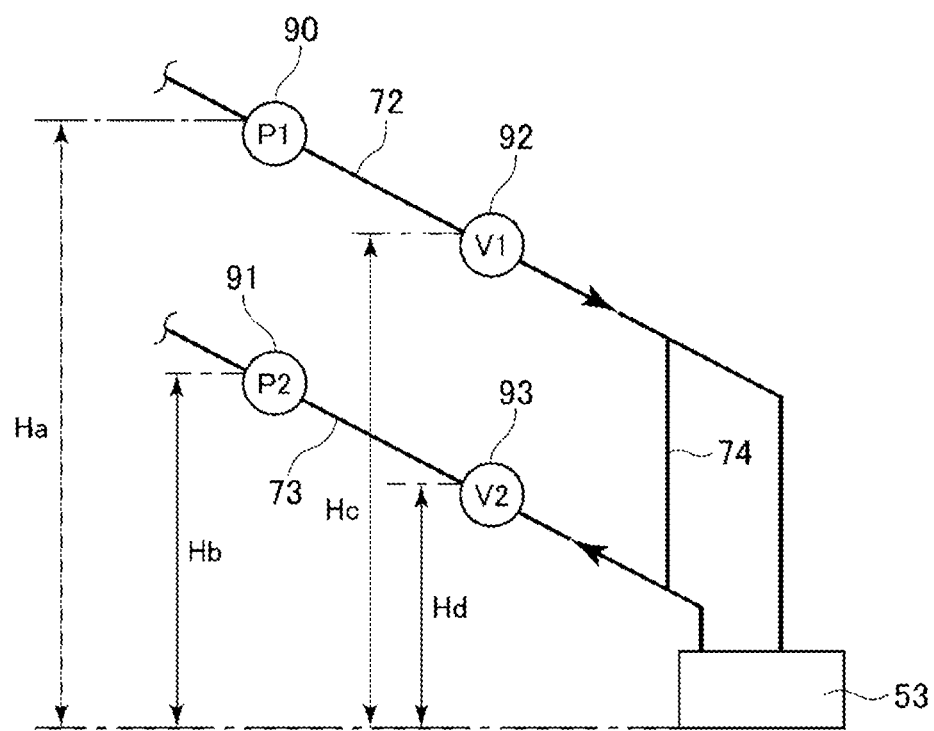
FIG. 9 A diagram showing an image of hydrocephalus pressure in a direction along the paint channel with respect to the pose of the painting head in the painting robot shown in FIG. 1.

The pressure control at paint supply control 140 is described below. FIG. 9 is a diagram illustrating an image of hydrohead pressure in a direction along the paint channel (Y direction) relative to the pose of the painting head 53. FIG. 10 is a diagram illustrating an image of hydrohead pressure in a direction (Y direction) along the paint channel when the robot arm R1 is in a generally horizontal state. As shown in FIG. 9, there is a height between the supply pump 90, the suction pump 91, the first paint regulator 92, the second paint regulator 93, and the drive site such as the painting head 53, respectively. Therefore, the drive of each drive site is controlled according to this height difference.

Specifically, as shown in FIG. 10, the measured position of the painting head 53 and the measured position of each of the supply pump 90, suction pump 91, first paint regulator 92 and second paint regulator 93 are Ha0, Hb0, Hc0, Hd0 when the robot arm R1 is in a predetermined reference position, such as a horizontal position. At this time, the hydrocephalus pressure Pa0 to Pd0 at the measurement position of the painting head 53 and the measurement position of the supply pump 90, suction pump 91, first paint regulator 92 and second paint regulator 93, respectively, are:

$$Pa0 = \rho \cdot g \cdot Ha0 \quad \text{(Formula a1)}$$

$$Pb0 = \rho \cdot g \cdot Hb0 \quad \text{(Formula b1)}$$

$$Pc0 = \rho \cdot g \cdot Hc0 \quad \text{(Formula c1)}$$

$$Pd0 = \rho \cdot g \cdot Hd0 \quad \text{(Formula d1)}$$

From this state, for example, due to the posture change of the robot arm R1, the height difference between the measurement position of the painting head 53 and the measurement positions of the supply pump 90, the suction pump 91, the first paint regulator 92 and the second paint regulator 93 is ΔHan, ΔHbn, ΔHcn, and ΔHdn. At this time, the change in the height difference increases or decreases the hydrohead pressure at the painting head 53. Therefore, in order to keep the ejection pressure of the paint droplet constant, it would be necessary to control the drive of each drive site (i.e., supply pump 90, suction pump 91, first paint regulator 92 and second paint regulator 93) in a direction that cancels the above mentioned change in hydrohead pressure (hydrohead pressure difference).

Based on the above, the hydrocephalus pressure difference ΔPa to ΔPd at the measurement position of the painting head 53 and the measurement position of the supply pump 90, suction pump 91, first paint regulator 92 and second paint regulator 93, respectively, is $$\Delta Pa = \rho \cdot g \cdot \Delta Ha \quad \text{(Formula a2)}$$

$$\Delta Pb = \rho \cdot g \cdot \Delta Hb \quad \text{(Formula b2)}$$

$$\Delta Pc = \rho \cdot g \cdot \Delta Hc \quad \text{(Formula c2)}$$

$$\Delta Pd = \rho \cdot g \cdot \Delta Hd \quad \text{(Formula d2)}$$

For this reason, the pressure of the water pressure Pa-Pd is $$Pa = \rho \cdot g \cdot Ha0 + \rho \cdot g \cdot \Delta Ha = \rho \cdot g \cdot Ha \quad \text{(Formula a3)}$$

$$Pb = \rho \cdot g \cdot Hb0 + \rho \cdot g \cdot \Delta Hb = \rho \cdot g \cdot Hb \quad \text{(Formula b3)}$$

$$Pc = \rho \cdot g \cdot Hc0 + \rho \cdot g \cdot \Delta Hc = \rho \cdot g \cdot Hc \quad \text{(Formula c3)}$$

$$Pd = \rho p \cdot g \cdot Hd0 + \rho \cdot g \cdot \Delta Hd = \rho \cdot g \cdot Hd \quad \text{(Formula d3)}$$

Note that while the following (Formula a4) to (Formula d4) are related to rotation in the XZ plane, if ΔHa to ΔHd described above are considered to be due to rotation of the robot arm R1 in the YZ plane, ΔHa to ΔHd in (Formula a3) to (Formula d3) can be expressed based on the rotation angle and distance between the rotation center, as described below (Formula a4) to (Formula d4).

Therefore, as is clear from (Formula a3) to (Formula d3), if the pressure setting is not corrected at all, the hydrohead pressure Pa to Pd will remain increased (changed) by the difference in hydrohead pressure ΔPa to ΔPd. Here, the respective pressure settings of the supply pump 90, suction pump 91, first paint regulator 92 and second paint regulator 93 are the pressure settings SPa to SPd. This pressure setpoint SPa to SPd compensates the pressure setpoint SPa0 to SPd0 at the reference position corresponding to the hydrohead pressure Pa0 to Pd0 with the corrected pressure setpoint −ΔSPa to −ΔSPd in the direction of canceling the hydrohead pressure difference ΔPa to ΔPd in the increasing portion (change) so that the ejection pressure of paint droplets from the painting head 53 can be kept constant.

The above is the principle of controlling the hydrocephalic pressure differential, and according to the values of the above-described corrected pressure set points −ΔSPa to −ΔSPd, the pressure set point may be linearly corrected to control the drive of each drive site (i.e., supply pump 90, suction pump 91, first paint regulator 92 and second paint regulator 93).

However, in practice, the effect of the hydrocephalic pressure difference is often small even if the high and low differences of each drive site (i.e., supply pump 90, suction pump 91, first paint regulator 92 and second paint regulator 93) vary slightly. Therefore, as shown in FIG. 11, it is preferred that the corrected pressure set point −ΔSPa to −ΔSPd be phased according to the value of the hydrocephalus pressure difference ΔPa to ΔPd. FIG. 11 is a diagram illustrating an example of a control table with a plurality of corrected pressure settings −ΔSPa through −ΔSPd.

In FIG. 11, a control table is shown with a plurality of corrected pressure settings −ΔSPa to −ΔSPd. However, the pressure setting values SPa to SPd are calculated by simply adding the corrected pressure setting values −ΔSPa to −ΔSPd to the pressure setting values SPa0 to SPd0 at the reference position. The control table may be composed of the pressure setting values SPa to SPd instead of the control table composed of the corrected pressure set values −ΔSPa to −ΔSPd.

In addition, FIG. 11 shows a case where the corrected pressure set point −ΔSPa to −ΔSPd was changed in five stages (n=1 to 5) as −ΔSPan to −ΔSPdn, but if there are multiple stages, it may be set to any number of stages. In FIG. 11, it is assumed that the absolute value of the corrected pressure set value increases as the number of stages increases. Therefore, while the corrected pressure setpoint −ΔSPa1 to −ΔSPd1 in stage 1 does not compensate much for the pressure setpoint SPa0 to SPd0 in the reference position, the corrected pressure setpoint −ΔSPa5 to −ΔSPd5 in stage 5 is in a state where it compensates significantly for the pressure setpoint SPa0 to SPd0 in the reference position.

Here, in the control table shown in FIG. 11, the corresponding level of corrected pressure setpoint −ΔSPa to −ΔSPd can be selected for each drive site depending on the hydrocephalus pressure difference of each drive site (i.e., supply pump 90, suction pump 91, first paint regulator 92 and second paint regulator 93). For example, the supply pump 90 is set as the corrected pressure set point −ΔSPa1 in stage 1, the suction pump 91 is set as the corrected pressure set point −ΔSPb3 in stage 3, the first paint regulator 92 is set as the corrected pressure set point −ΔSPc4 in stage 4, and the second paint regulator 93 is set as the corrected pressure set point −ΔSPd2 in stage 2.

However, it is acceptable to select the corrected pressure setpoint −ΔSPa to −ΔSPd for each drive site in a common stage when selecting corrected pressure setpoint −ΔSPa to −ΔSPd for each drive site, rather than selecting the individual corrected pressure setpoint −ΔSPa to −ΔSPd for each drive site. For example, based on the respective hydrocephalic pressure differentials of the supply pump 90, suction pump 91, the first paint regulator 92 and the second paint regulator 93, one of stages 1 through 5 (e.g., step 3 corrected pressure setpoint −ΔSPa3 to −ΔSPd3) may be selected according to the predetermined criteria. As a predetermined judgment criterion described above, for example, it may be the average value of the pressure setpoint for each drive site, or it may be the pressure setpoint for any of the drive sites.

Also, if the first paint regulator 92 and the second paint regulator 93 are closed completely, the control to close the internal channel is no longer possible. In addition, if the first paint regulator 92 and the second paint regulator 93 are fully open, the control to open the internal channel is no longer possible.

Thus, in the present embodiment, the first paint regulator 92 and the second paint regulator 93 are adjusted to their pressure set points SPc, SPd so that they are not fully closed when they are most closed, and also not fully open when they are most open (i.e., such that an adjustment charge exists). That is, even the pressure set points SPc and SPd after being compensated by the corrected pressure set points −ΔSPc and −ΔSPd allow operation control to be performed in both the opening direction and the closing direction of the first paint regulator 92 and the second paint regulator 93.

If the pressure setting SPc and SPd are set so that the maximum and minimum values of the pressure setting values after correction are near the middle of the maximum and minimum values of the pressure setting values when the pressure setting values SPc and SPd are corrected with the corrected pressure setting values −ΔSPc and −ΔSPd, the first paint regulator 92 and the second paint regulator 93 will not be fully closed even when the pressure is closed or fully open even when the pressure setting is opened.

Figure 12:
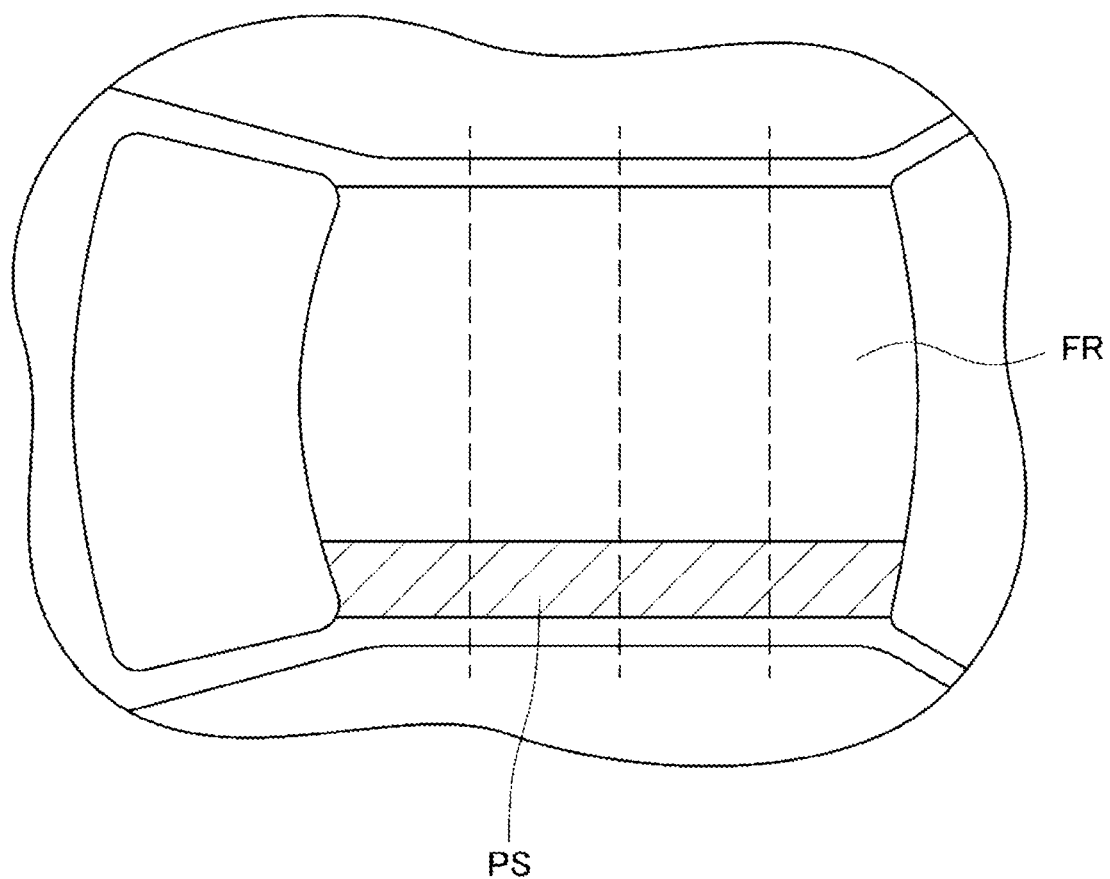
FIG. 12 A diagram showing an image of a multi-stage pressure set point set in the paint channel of a vehicle painted with a painting robot shown in FIG. 1.

Correcting the pressure set point with the corrected pressure set point as described above can be set in multiple stages in the paint channel of the vehicle FR, which is the paint object, as shown in FIG. 12. In FIG. 12, an example is shown in which the pressure setpoint corrected with the corrected pressure setpoint is set in four dashed lines (in four steps) along the direction of the paint channel. That is, in the paint channel PS shown in hatching, the set of drive sites, such as the supply pump 90, the suction pump 91, the first paint regulator 92 and the second paint regulator 93, are set of four different pressure set points, and their drive is controlled. The control table corresponding to FIG. 12 is stored in the control memory 141.

Here, in the example shown in FIG. 12, based on the current position (coordinate data) detected by the position sensor 300, and the pressure set values SPa to SPd can be corrected with the corrected pressure set values −ΔSPa to −ΔSPd corresponding to the current position. At this time, even if only the traveling distance is detected by the position sensor 300, robotic painting can associate the traveling distance with the height in the vertical direction (Z direction). Therefore, even if only the travel distance is detected by the position sensor 300, it is possible to calculate the hydrohead pressure difference ΔPa to ΔPd well, and to correct the pressure setting SPa to SPd with the corrected pressure setting value corresponding to the hydrohead pressure difference ΔPa to ΔPd and −ΔSPa to −ΔSPd.

In the example shown in FIG. 12, for example, when painting a beveled part of an edge portion of the vehicle FR, the pressure setpoint SPa to SPd can be corrected with a corrected pressure setpoint corresponding to the angle of inclination detected by the tilt sensor 310. Also, from the current position (coordinate data) of the painting head 53 detected by the position sensor 300 described above, the tilt angle of the painting head 53 can be calculated, and the pressure set point SPa to SPd can be corrected with the corrected pressure set point corresponding to that tilt angle. Even in this case, the position sensor 300 can, for example, match its travel distance with the height of the vertical direction (Z-direction) and the tilt angle of the painting head 53, even if only the travel distance is detected. Therefore, even if only the travel distance is detected by the position sensor 300, it is possible to calculate the hydrohead pressure difference ΔPa to ΔPd well, and it is possible to correct the pressure setpoint SPa to SPd with the corrected pressure setpoint corresponding to the hydrohead pressure difference ΔPa to ΔPd.

Here, it will be described when correcting the pressure setpoint at a corrected pressure setpoint based on the angle of inclination of the painting head 53 detected by the above tilt sensor 310 or based on the angle of inclination of the painting head 53 calculated from the current position (coordinate data) of the painting head 53 detected by the position sensor 300.

FIG. 13 is a diagram showing the state before and after the painting head 53 is inclined with respect to the direction (longitudinal direction of the painting head 53; X direction) perpendicular to the direction of the painting channel (Y direction). (A) shows the state before the painting head 53 is tilted, and (B) shows the state after the painting head 53 is tilted. A corrected pressure setpoint that corrects the pressure setpoint can be set for each drive site (i.e., supply pump 90, suction pump 91, first paint regulator 92 and second paint regulator 93). Therefore, as shown in FIG. 13(A), the state before the painting head 53 is inclined with respect to the direction perpendicular to the direction of the coating path (longitudinal direction of the painting head 53; X direction). Even when the painting head 53 is inclined with respect to the direction perpendicular to the direction of the coating path (longitudinal direction of the painting head 53; X direction) as shown in FIG. 13(B). The pressure setpoints of the respective drive components (ie, supply pump 90, suction pump 91, first paint regulator 92 and second paint regulator 93) can be corrected with corrected pressure setpoints. The control table corresponding to FIG. 13(B) can then be stored in the control memory 141.

It should be noted that in the state where the painting head 53 is tilted, as shown in FIG. 13(B), the correction pressure setting may be set for each predetermined angle of the tilt angle relative to the longitudinal direction (X direction) of the painting head 53, for example. In FIG. 13(B), the center of rotation when the painting head 53 is tilted is the longitudinal center O1 of the painting head 53. Therefore, it is possible to combine the corrected pressure setpoint due to high/low difference with the corrected pressure setpoint due to tilt angle. It should be noted that the control table in which the corrected pressure setpoint due to the high/low difference is combined with the corrected pressure setpoint due to the tilt angle can be stored in the control memory 141.

For example, in FIG. 13(B), the distance in the X direction from center O1 to supply pump 90 is L1, the distance in the X direction from center O1 to suction pump 91 is L2, the distance in the X direction from center O1 to the first paint regulator 92 is L3, and the distance in the X direction from center O1 to the second paint regulator 93 is L4. Also, the painting head 53 is tilted by an angle θ. In this case, from (Formula a3) to (d3) above, it is $$Pa = \rho \cdot g \cdot Ha0 + \rho \cdot g \cdot (\Delta Ha + L1 \sin \theta) \quad \text{(Formula a4)}$$

$$Pb = \rho \cdot g \cdot Hb0 + \rho \cdot g \cdot (\Delta Hb - L2 \sin \theta) \quad \text{(Formula b4)}$$

$$Pc = \rho \cdot g \cdot Hc0 + \rho \cdot g \cdot (\Delta Hc + L3 \sin \theta) \quad \text{(Formula c4)}$$

$$Pd = \rho \cdot g \cdot Hd0 + \rho \cdot g \cdot (\Delta Hd - L4 \sin \theta) \quad \text{(Formula d4)}$$

Therefore, when the painting head 53 is tilted by an angle θ about the center O1, the corrected pressure set values of the supply pump 90, the suction pump 91, the first paint regulator 92 and the second paint regulator 93 are $-\Delta SPa$ to $-\Delta SPd$, reflecting the height differences $\Delta Ha + L1 \sin \theta$, $\Delta Hb - L2 \sin \theta$, $\Delta Hc + L3 \sin \theta$ and $\Delta Hd - L4 \sin \theta$ instead of reflecting the height differences $\Delta Ha$, $\Delta Hb$, $\Delta Hc$ and $\Delta Hd$.

The angle θ may also be the angle that changes linearly. However, as described above, actually, even if the height difference of each drive site (that is, the supply pump 90, the suction pump 91, the first paint regulator 92 and the second paint regulator 93) changes somewhat, in many cases, the effect of the head pressure difference is small. Therefore, as illustrated in FIG. 11, the angle θ may be stepwise changes. One example of this is that the angle θ is set every 30 degrees, for example, but it can be set at various stages such as every 45 degrees, every 20 degrees, every 15 degrees, every 10 degrees, every 5 degrees, etc.

2. About the Effect

As described above, the painting robot 10 that paints the vehicle FR includes a plurality of nozzles 54 that eject droplets, and the painting head 53 that includes the piezoelectric substrate 62 that pushes the droplets out of the nozzles 54 when driven; a painting head unit 50, a robot arm R1 having the painting head unit 50 attached to its tip and moving the painting head unit 50 to a desired position; a paint supply mechanism 70 provided between the robot arm R1 and the painting head unit 50, and a control unit 100 for controlling the driving of the robot arm R1 and the paint supply mechanism 70. The paint supply mechanism 70 includes: a paint supply channel 72 for supplying paint to painting head 53; and connected to the paint discharge side of the painting head 53; a return channel 73 for recovering paint not dispensed from nozzle 54; mounted in place of the robot arm R1; Along with the paint supply channel 72, a supply pump 90 (paint supply means) applying pressure to supply paint to the painting head 53 based on control at the control portion 100; mounted in place of the robot arm R1; as provided in the middle of the return channel 73, a suction pump 91 (paint recovery means) that applies pressure to the downstream side of the channel 73 to recover paint not dispensed from the painting head 53 based on control at the control unit 100; and provided in painting head unit 50, a supply pump 90 (paint supply means) is provided downstream of the paint supply channel 72; a first paint regulator 92 (first adjustment valve) to adjust the pressure of the paint towards the painting head 53 based on control at the control unit 100; provided in painting head unit 50, is provided upstream of the return channel 73 rather than the suction pump 91 (paint recovery means), a second paint regulator 93 (second adjustment valve) that adjusts the pressure of the paint recovered from the painting head 53 based on control at the control unit 100.

The control unit 100 also comprises a control memory 141 in which the pressure set point is stored, a supply pump 90 (paint supply means), a suction pump 91 (paint recovery means), a paint supply control unit 140 in which at least one of the first paint regulator 92 (first adjustment valve) and the second paint regulator 93 (second adjustment valve) controls operation so that the pressure set point is read from the control memory 141, and controls operation of at least one of the supply pump 90 (paint supply means) and the suction pump 91 (paint recovery means) while adjusting the openness of the first paint regulator 92 (first adjustment valve) and second paint regulator 93 (second adjustment valve) within a range having a predetermined adjustment factor when controlling the pressure set point at the paint supply control unit 140.

In this way, because the supply pump 90 (paint supply means) and the suction pump 91 (paint recovery means) are mounted in place of the robot arm R1, the weight of the painting head unit 50 can be reduced. Thus, it is possible to improve the performance of the painting robot 10 in painting. Also, by reducing the weight of the painting head unit 50, the strength and rigidity of the robot arm R1 do not need to be increased more than necessary, so it is possible to reduce the overall weight of the painting robot 10 to achieve miniaturization.

The control unit 100 can also control four of the supply pump 90 (paint supply means), suction pump 91 (paint recovery means), first paint regulator 92 (first adjustment valve), and second paint regulator 93 (second adjustment valve). Thus, even if the robot arm R1 takes a pose such that a hydrocephalic pressure differential occurs within the robot arm R1, for example, it is possible to reduce the effect of hydrocephalic pressure differential in the robot arm R1 above by controlling the operation of at least one of the supply pump 90 (paint supply means) and the suction pump 91 (paint recovery means) in addition to the opening and closing of the first paint regulator 92 (first adjustment valve) and the second paint regulator 93 (second adjustment valve).

Also, because the first paint regulator 92 (first adjustment valve) and the second paint regulator 93 (second adjustment valve) are controlled within the range that leaves the adjustment charge so that they do not open or close fully, even if pressure fluctuations occur in the paint dispensed from the painting head 53, control corresponding to the pressure fluctuations can be performed at all times.

Also, in the present embodiment, a pressure sensor S2 (first pressure sensor) detects the pressure of paint dispensed from the supply pump 90 (paint supply means) downstream of the paint supply channel 72 than at least the supply pump 90 (paint supply means), a pressure sensor S5 (second pressure sensor) detects the pressure of paint passed through the first paint regulator 92 (first adjustment valve) downstream of the paint supply channel 72 than at least the first paint regulator 92 (first adjustment valve), a pressure sensor S7 (third pressure sensor) detects the pressure of paint dispensed from the second paint regulator 93 (second adjustment valve) downstream of the return channel 73 than at least the second paint regulator 93 (second adjustment valve), and a suction pump 91 (paint recovery means) downstream of the return channel 73. The supply pump 90 (paint supply control unit) then performs control of at least one actuation of the supply pump 90 (paint supply means), suction pump 91 (paint recovery means), first paint regulator 92 (first adjustment valve), and second paint regulator 93 (second adjustment valve) such that the pressure of the paint is the pressure set at the pressure setpoint based on the detection results of at least one of the pressure sensor S2 (first pressure sensor), pressure sensor S5 (second pressure sensor), pressure sensor S7 (third pressure sensor), and pressure sensor S8 (fourth pressure sensor).

As such, by measuring the pressure with the pressure sensor S2 (first pressure sensor), the pressure sensor S5 (second pressure sensor), the pressure sensor S7 (third pressure sensor) and the pressure sensor S8 (fourth pressure sensor), and performing at least one control of the supply pump 90 (paint supply means), the suction pump 91 (paint recovery means), the first paint regulator 92 (first adjustment valve), and the second paint regulator 93 (second adjustment valve) so as to be the pressure set at the pressure setpoint, it is possible to follow the pressure setpoint of the paint. Thereby, the pressure of the droplets of paint ejected from the nozzle 54 can be stabilized to a constant pressure, which can improve paint quality.

Also, in the present embodiment, the control memory 141 is stored in a control table having a plurality of pressure settings set for each of the plurality of control conditions, and the control table can be provided with a plurality of pressure settings for each of the supply pump 90 (paint supply means), suction pump 91 (paint recovery means), first paint regulator 92 (first adjustment valve), and second paint regulator 93 (second adjustment valve).

As such, the control table has a plurality of pressure set points set for each control condition, so that the paint supply control unit 140 controls the operation of the supply pump 90 (paint supply means), suction pump 91 (paint recovery means), first paint regulator 92 (first adjustment valve), and second paint regulator 93 (second adjustment valve) so as to become the element pressure set point set at each pressure set point. Thereby, the pressure of the droplets of paint ejected from the nozzle 54 can be stabilized to a constant pressure, which can improve paint quality.

In addition, in the present embodiment, the painting head 53 is mounted with an angle sensor 310 (angle detection means) that detects the angle of inclination of the painting head 53, and the control table is provided with a pressure set point for each angle of inclination of the painting head 53, wherein the paint supply control unit 140 selects a pressure set point from the control table corresponding to the angle of inclination of the painting head 53 detected by the angle sensor 310 (angle detection means), and the paint supply control unit 140 can perform at least one operational control of the supply pump 90 (paint supply means), the suction pump 91 (paint recovery means), the first paint regulator 92 (first adjustment valve), and the second paint regulator 93 (second adjustment valve) based on the selected pressure set point.

As such, the control table comprises a pressure setpoint for each angle of inclination of the painting head 53. Therefore, the paint supply control unit 140 selects a pressure set point from the control table corresponding to the angle of inclination of the painting head 53 detected by the tilt sensor 310 (angle detection means), and controls at least one operation of the supply pump 90 (paint supply means), the suction pump 91 (paint recovery means), the first paint regulator 92 (first adjustment valve), and the second paint regulator 93 (second adjustment valve) so as to be the selected pressure set point. Thereby, the pressure of the droplets of paint ejected from the nozzle 54 can be stabilized to a constant pressure, which can improve paint quality.

Also, in the present embodiment, the control table is provided with a pressure set point for each coordinate data of the robot arm R1, wherein the paint supply control unit 140 selects a pressure set point corresponding to that coordinate position from the control table based on the current coordinate position of the robot arm R1, and wherein the paint supply control unit 140 can perform control of at least one actuation of the supply pump 90 (paint supply means), the suction pump 91 (paint recovery means), the first paint regulator 92 (first adjustment valve), and the second paint regulator 93 (second adjustment valve) based on the selected pressure set point.

In this way, the control table has a pressure set point for each coordinate data of the robot arm R1. For this reason, the paint supply control unit 140 selects a pressure set point corresponding to the coordinated position from the control table based on the current coordinated position of the robot arm R1 and controls at least one operation of the supply pump 90 (paint supply means), suction pump 91 (paint recovery means), first paint regulator 92 (first adjustment valve), and second paint regulator 93 (second adjustment valve) so as to be the selected pressure set point. Thereby, the pressure of the droplets of paint ejected from the nozzle 54 can be stabilized to a constant pressure, which can improve paint quality.

3. About Variations

Although one embodiment of the present invention has been described above, the present invention is variously deformable other than the above embodiments.

Deformations are Described Below

In the embodiment described above, a configuration comprising pressure sensors S1-S8 and a first flow meter FM1 and a second flow meter FM2 is employed. However, if the first flow meter FM1 and the second flow meter FM2 are provided, at least one of the pressure sensors S1-S8 may be omitted, and if the pressure sensors S1-S8 are provided, at least one of the first flow meter FM1 and the second flow meter FM2 may be omitted.

Reference Signs List

10—Painting robot, 11—Paint Robot System, 20—Robot main body, 21—Base, 22a—First rotational axis, 22b—Second rotational axis, 22c—3rd rotational axis, 22d—4th rotational axis, 22e—Fifth rotational axis, 22f—6th rotational axis, 23—Legs, 24—First Movement Arm, 25—Second Movement Arm, 26—Rotating Arm, 27—Wrist portion, 50—Painting head unit, 52—Nozzle forming surface, 53—Painting head, 54—Nozzle, 55—Nozzle row, 55A—First Nozzle Row, 55 B—2nd Nozzle Row, 57—Supply side channel, 58—Supply channel, 59—Nozzle pressurization chamber, 59a—Nozzle supply channel, 59b—Nozzle discharge channel, 60—Row-directed discharge channel, 61—discharge side major channel, 62—Piezoelectric substrate, 63a—Piezoelectric ceramic layer, 63b—Piezoelectric ceramic layer, 64—Common electrode, 65—Individual electrodes, 70—Paint Supply Mechanism, 71—Paint Circulation Channel, 72—Paint supply channel, 73—Return channel, 74—Bypass channel, 75—External Supply Channel, 76—Bubble removal member, 77—Three-way valve, 78—OPEN/CLOSE VALVE, 79—Three-way valve, 80—Switching valve, 81—Outlet, 90—Supply Pump (Compatible with Paint Supply Methods), 91—Suction pump (Compatible with Paint Recovery Methods), 92—1st paint regulator (compatible with 1st adjustment valve), 93—2nd Paint Regulator (compatible with 2nd Adjustment Valve), 94—Degassing module, 95—Removal filter, 96—Suction conduit, 97—Vacuum pump, 100—Control unit, 110—Main control unit, 120—Arm Control, 130—Head Control, 140—Paint Supply Control, 141—Control memory, 200—Image processing equipment, 210—Image processing unit, 220—Memory, 300—Position Sensor, 310—Slope sensor (corresponding to angle detection means), FM1—First flow meter, FM2—Second flow meter, FR—Vehicle, PS—Paint channel, R1—Robotic arm, S1 to S8—Pressure sensor

The invention claimed is:
1. A painting robot for painting a paint object, comprising:
a painting head unit comprising:
  a plurality of nozzles for ejecting droplets; and
  a painting head comprising a piezoelectric substrate for driving the droplets out of the plurality of nozzles;
a robot arm attaching the painting head unit to a tip and moving the painting head unit to a desired position;
a paint supply mechanism disposed between the robot arm and the painting head unit;
a control unit controlling drive of the robot arm and the paint supply mechanism;
wherein the paint supply mechanism comprises:
  a paint supply channel for providing paint to the painting head;
  a return channel connected to a paint discharge side of the painting head to recover the paint not dispensed from the plurality of nozzles; and
  a paint supply means mounted in place of the robot arm and disposed midway through the paint supply channel and applying pressure to supply the paint to the painting head based on control at the control unit; and
  a paint recovery means mounted in a predetermined position of the robot arm and disposed midway through the return channel and applying pressure downstream of the return channel to recover the paint not dispensed from the painting head based on control at the control unit; and
a first adjustment valve provided in the painting head unit and provided downstream of the paint supply channel rather than the paint supply means and adjusting a pressure of the paint towards the painting head based on control at the control unit; and
a second adjustment valve provided in the painting head unit and provided upstream of the return channel rather than the paint recovery means and adjusting a pressure of paint recovered from the painting head based on control at the control unit; and
wherein the control unit comprises:
  a control memory in which the pressure setpoint is stored; and
  a paint supply control unit that performs control of operation of at least one of the paint supply means, the paint recovery means, the first adjustment valve, and the second adjustment valve so as to be the pressure setpoint read from the control memory; and
  when the paint supply control unit controls the pressure of the paint so as to reach the pressure setpoint, the opening degrees of the first adjustment valve and the second adjustment valve are adjusted within a range having a predetermined adjustment margin, controlling the operation of at least either one of the paint supply means and the paint recovery means;
wherein the painting head is provided with angle detection means for detecting an inclination angle of the painting head;
wherein the control memory stores a control table having a plurality of pressure setting values set for each of a plurality of control conditions;
  wherein the control table is provided with the plurality of pressure setting values for each inclination angle of the painting head; and
wherein when a pressure setting value is provided, and the paint supply control unit selects the pressure setting value corresponding to the inclination angle of the painting head detected by the angle detection means from the control table and the paint supply control unit, based on the selected pressure setting value, controls the operation of at least one unit including the paint supply means, the paint recovery means, the first adjustment valve, and the second adjustment valve.

2. The painting robot according to claim 1, further comprising:
a first pressure sensor for detecting the pressure of the paint discharged from the paint supply means downstream of the paint supply means in said paint supply channel;
a second pressure sensor for detecting the pressure of the paint that has passed through the first adjustment valve at least downstream of the first adjustment valve in the paint supply channel;
a third pressure sensor for detecting the pressure of the paint discharged from the second adjustment valve and at least downstream of the second adjustment valve in the return channel; and
a fourth pressure sensor for detecting the pressure of paint discharged from the paint recovery means at least downstream of the return flow channel from the paint recovery means, wherein the paint supply control unit is based on the detection result of at least one sensor including the first pressure sensor, the second pressure sensor, the third pressure sensor, and the fourth pressure sensor, the pressure of the paint is adjusted to the pressure set by the pressure setting value and controlling the operation of at least one unit including the paint supply means, the paint recovery means, the first adjustment valve, and the second adjustment valve.

3. The painting robot according to claim 2,
wherein the control table is provided with the plurality of pressure setting values for each of the paint supply means, the paint recovery means, the first adjustment valve, and the second adjustment valve.

4. The painting robot according to claim 3,
wherein the control table is provided with the pressure setting value for each coordinate data of the robot arm, and the paint supply control unit controls the current coordinate position of the robot arm,
selects the pressure setting value corresponding to the coordinate position from the control table, and the paint supply control unit, based on the selected pressure setting value,
controls the operation of at least one unit including the paint supply means,
the paint recovery means, the first adjustment valve, and the second adjustment valve.

\* \* \* \* \*